US012394559B2

United States Patent
Yoshioka et al.

(10) Patent No.: US 12,394,559 B2
(45) Date of Patent: Aug. 19, 2025

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Katsufumi Sasaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1031 days.

(21) Appl. No.: 17/410,583

(22) Filed: Aug. 24, 2021

(65) Prior Publication Data

US 2022/0068553 A1 Mar. 3, 2022

(30) Foreign Application Priority Data

Aug. 26, 2020 (JP) .................. 2020-142763

(51) Int. Cl.
*H01F 27/28* (2006.01)
*H01F 27/24* (2006.01)
(Continued)

(52) U.S. Cl.
CPC ............. *H01F 27/29* (2013.01); *H01F 27/24* (2013.01); *H01F 27/2804* (2013.01); *B33Y 80/00* (2014.12); *H01F 41/041* (2013.01)

(58) Field of Classification Search
CPC ........ H01F 27/24; H01F 27/28; H01F 27/306; H01F 2027/065; H01F 27/2852; H01F 27/34; H02M 3/003; H02M 1/327; H02M 1/0064; H02M 1/40; H02M 3/1584; H02M 1/00
(Continued)

(56) References Cited

U.S. PATENT DOCUMENTS

2017/0213639 A1* 7/2017 Kudo .................. H01F 27/366
2019/0156977 A1* 5/2019 Jung .................... H01F 27/292
(Continued)

FOREIGN PATENT DOCUMENTS

CN    106992062 A    7/2017
JP    H06-120076 A   4/1994
(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

The main face of an element body of an inductor component has a two-fold symmetrical shape with respect to the geometric center of the main face. First and second inductor wires extend inside the element body. Four terminal portions, each having a terminal portion exposed from the main face, are in the element body, two of the which are first external terminals, one a second external terminal, and one a dummy portion which is a specific dummy portion. The main face is divided into four congruent imaginary regions with one terminal portion in each. The terminal portion in the first imaginary region, that is an imaginary region at a two-fold symmetrical position around the geometric center with respect to the fourth imaginary region having the specific dummy portion, is a specific terminal portion. The shapes of the specific dummy and terminal portions are different from each other.

20 Claims, 11 Drawing Sheets

(51) Int. Cl.
*H01F 27/29* (2006.01)
*B33Y 80/00* (2015.01)
*H01F 41/04* (2006.01)

(58) Field of Classification Search
USPC .................................. 336/221, 83, 170, 232
See application file for complete search history.

(56) References Cited

U.S. PATENT DOCUMENTS

2020/0098506 A1\* 3/2020 Hamada .................. H01F 27/32
2020/0194405 A1\* 6/2020 Koyanagi ............. H01L 25/072

FOREIGN PATENT DOCUMENTS

| JP | 2013-211330 A | 10/2013 |
| JP | 2017-130584 A | 7/2017 |
| JP | 2020-053483 A | 4/2020 |

\* cited by examiner

INDUCTOR COMPONENT

CROSS-REFERENCE TO RELATED APPLICATION

This application claims benefit of priority to Japanese Patent Application No. 2020-142763, filed Aug. 26, 2020, the entire content of which is incorporated herein by reference.

BACKGROUND

Technical Field

The present disclosure relates to an inductor component.

Background Art

The inductor component disclosed in Japanese Patent Application Laid-Open No. 2013-211330 includes a rectangular parallelepiped element body containing a magnetic material. Two inductor wires are disposed inside the element body. Each inductor wire extends in a spiral shape. In addition, the two inductor wires are disposed side by side in the element body. Both ends of each of the inductor wires are exposed from the outer face of the element body. That is, the four ends of the inductor wire are exposed from the outer face of the element body. Four external terminals are formed on the outer face of the element body so as to cover the ends of the inductor wires. The four external terminals are disposed at the corners of the element body. The four external terminals all have the same shape.

SUMMARY

In the inductor component, it is sometimes desired to identify the orientation of the inductor component depending on the arrangement, shape, and the like of the inductor wire. However, all the external terminals provided in the inductor component of Japanese Patent Application Laid-Open No. 2013-211330 have the same shape and are disposed at the corners of the element body. Therefore, it is difficult to accurately identify the orientation of the inductor component disclosed in Japanese Patent Application Laid-Open No. 2013-211330 based only on the appearance.

An aspect of the present disclosure is an inductor component including an element body having a main face, an inductor wire extending in parallel with the main face with the number of turns being 0.5 turns or less in the element body, a vertical wire extending in a thickness direction from the inductor wire toward the main face and connected to the inductor wire, and a plurality of terminal portions exposed from the main face. At least one of the plurality of terminal portions is an external terminal electrically connected to the inductor wire. Each of the other terminal portions other than the external terminal among the plurality of terminal portions is a dummy portion that is not electrically connected to the inductor wire. When viewed from the thickness direction, the main face has a two-fold symmetrical shape with respect to a geometric center of the main face. When the main face is divided into a plurality of mutually congruent imaginary regions, the number of the imaginary regions being equal to the number of the terminal portions when viewed from the thickness direction, the one terminal portion is disposed in each of the imaginary regions. When one of the dummy portions is defined as a specific dummy portion and the terminal portion provided in the imaginary region at a two-fold symmetrical position about the geometric center with respect to the imaginary region in which the specific dummy portion is provided is defined as a specific terminal portion, a shape of the specific dummy portion is different from a shape of the specific terminal portion.

In the inductor component having the above configuration, the shape of the specific dummy portion is different from the shape of the specific terminal portion positioned approximately diagonally to the specific dummy portion. Therefore, by using the shape of the specific dummy portion as an index, the orientation of the inductor component can be more accurately identified.

According to an aspect of the present disclosure, the orientation of the inductor component can be identified.

DETAILED DESCRIPTION

Figure 1:
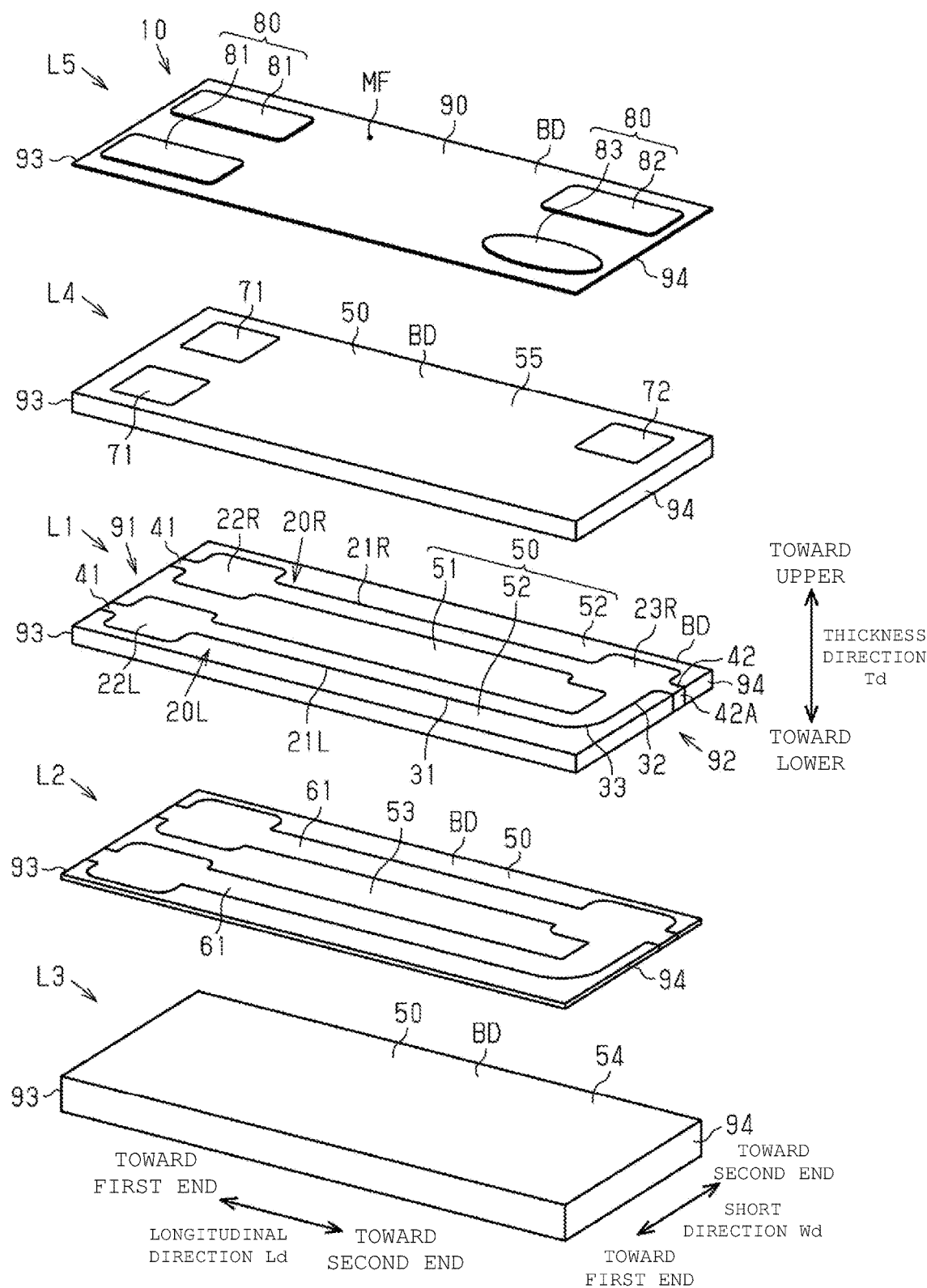
FIG. 1 is an exploded perspective view of an inductor component.

Hereinafter, the inductor component will be described. In the drawings, components may be illustrated in an enlarged manner for easy understanding. The dimension ratios of the components may be different from the actual ones or those in another figure.

Figure 21:
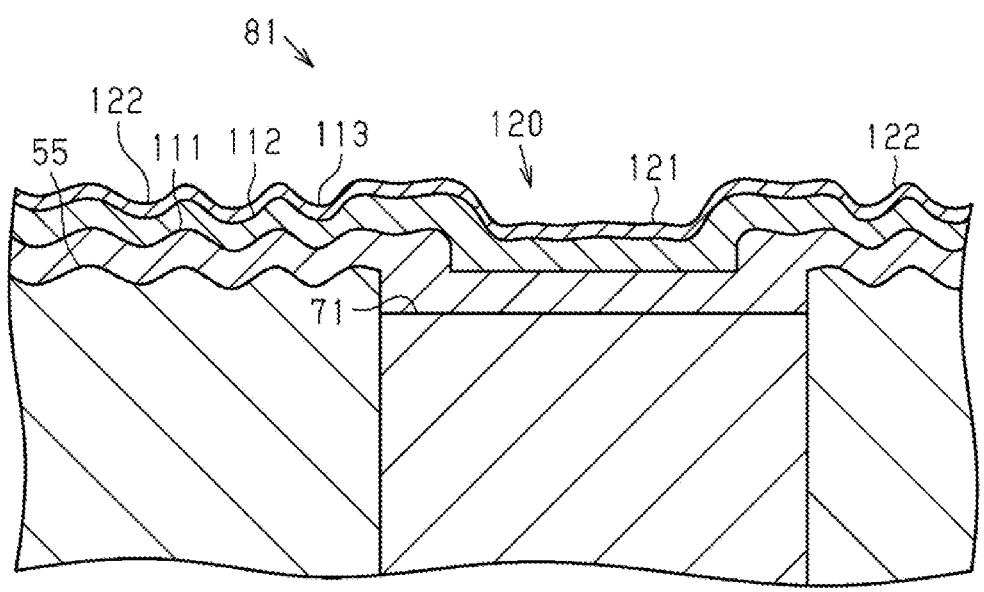
FIG. 21 is an enlarged sectional view of part of an external terminal of the inductor component.

As illustrated in FIG. 21, the inductor component 10 as a whole has a structure in which five layers are laminated in the thickness direction Td. In the following description, one side in the thickness direction Td is an upper side, and the opposite side is a lower side.

The first layer L1 includes the first inductor wire 20R, the second inductor wire 20L, the first support wire 41, the second support wire 42, the inner magnetic path portion 51, and the outer magnetic path portion 52.

The first layer L1 has a rectangular shape when viewed from the thickness direction Td. A direction along the long side of the rectangular shape is defined as a longitudinal direction Ld, and a direction along the short side is defined as a short direction Wd.

The first inductor wire 20R includes a first wiring body 21R, a first pad 22R provided at the first end of the first wiring body 21R, and a second pad 23R provided at the second end of the first wiring body 21R. The first wiring body 21R extends linearly in the longitudinal direction Ld of the first layer L1. The first pad 22R is connected to the first end, of the first wiring body 21R, toward the first end in the longitudinal direction Ld. The dimension of the first pad 22R in the short direction Wd is larger than the dimension of the first wiring body 21R in the short direction Wd. The first pad 22R has a substantially square shape when viewed from the thickness direction Td. In addition, the second pad 23R is connected to the second end, of the first wiring body 21R, toward the second end in the longitudinal direction Ld. The dimension of the second pad 23R in the short direction Wd is larger than the dimension of the first wiring body 21R in the short direction Wd. When viewed from the thickness direction Td, the second pad 23R has substantially the same square shape as the first pad 22R. The first inductor wire 20R is disposed close to the second end of the first layer L1 in the short direction Wd.

The second inductor wire 20L includes a second wiring body 21L, a first pad 22L provided at the first end of the second wiring body 21L, and the above-described second pad 23R provided at the second end of the second wiring body 21L.

The second wiring body 21L has two straight portions and a portion connecting the two straight portions, and extends in an L shape as a whole. Specifically, the second wiring body 21L includes a long straight portion 31 extending in the longitudinal direction Ld, a short straight portion 32 extending in the short direction Wd, and a connection portion 33 connecting these portions.

Figure 2:
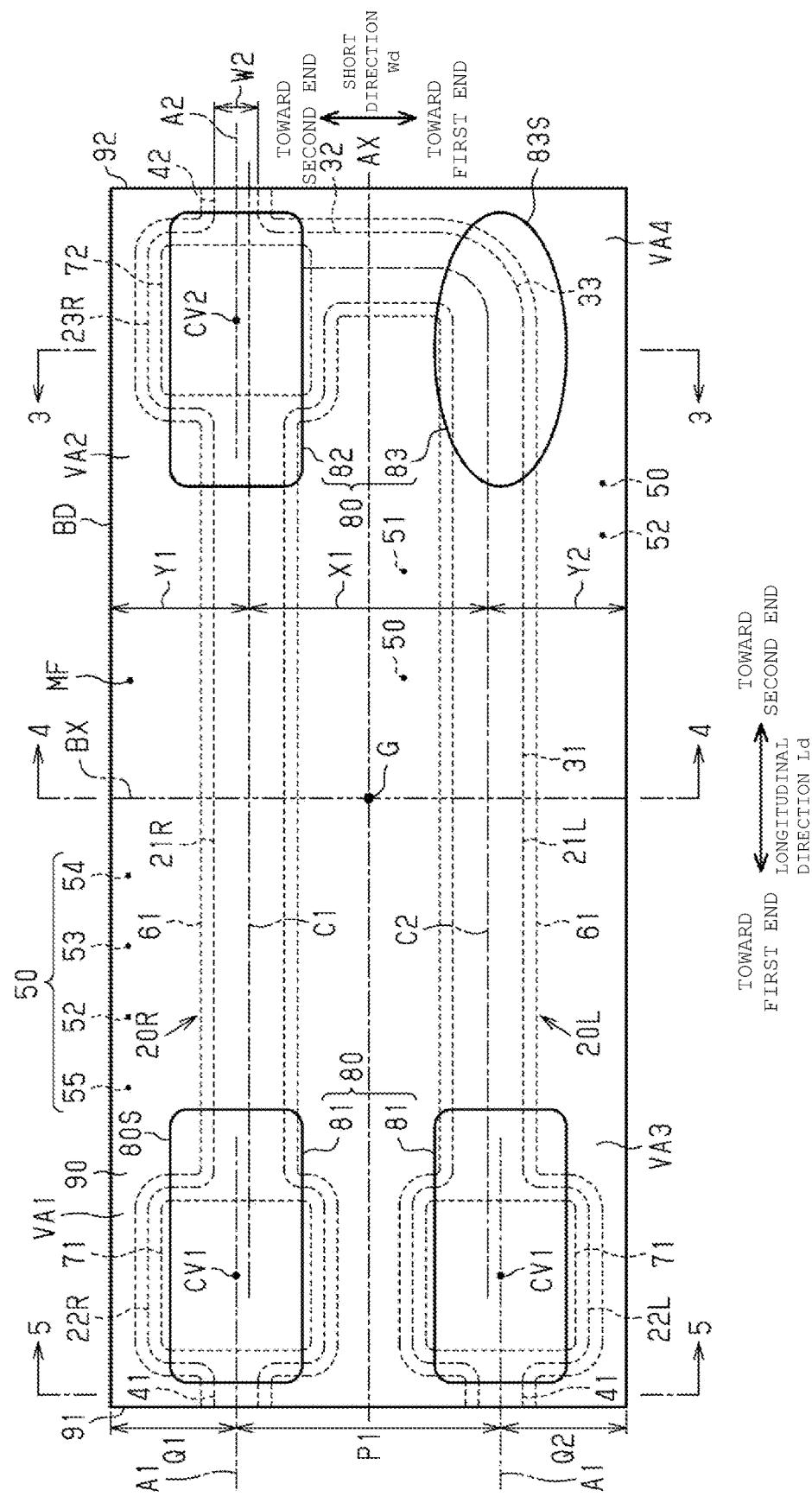
FIG. 2 is a transparent top view of an inductor component.

As illustrated in FIG. 2, when a straight line passing through the center of the first layer L1 in the short direction Wd and extending in the longitudinal direction Ld is defined as a symmetry axis AX, the long straight portion 31 is disposed at a position line-symmetric to that of the first wiring body 21R with respect to the symmetry axis AX. The length of the long straight portion 31 extending in the longitudinal direction Ld is slightly longer than the length of the first wiring body 21R extending in the longitudinal direction Ld. The dimension of the long straight portion 31 in the short direction Wd is equal to the dimension of the first wiring body 21R in the short direction Wd. The first end, of the long straight portion 31, toward the first end in the longitudinal direction Ld is connected to the first pad 22L. The second end, of the long straight portion 31, toward the second end in the longitudinal direction Ld is connected to the first end of the connection portion 33.

The second end, of the connection portion 33, that is not connected to the long straight portion 31 faces the second end in the short direction Wd. That is, in the second wiring body 21L, the connection portion 33 is curved at 90 degrees from the first end side in the longitudinal direction Ld toward the second end side in the short direction Wd.

The second end facing the second end of the connection portion 33 in the short direction Wd is connected to the first end of the short straight portion 32. The dimension of the short straight portion 32 in the longitudinal direction Ld is equal to the dimension of the long straight portion 31 in the short direction Wd. The second end, of the short straight portion 32, facing the second end in the short direction Wd is connected to the second pad 23R connected to the first wiring body 21R. That is, the second pad 23R in the first inductor wire 20R is identical to the second pad 23R in the second inductor wire 20L.

The number of turns of the second inductor wire 20L is determined based on the imaginary vector. The start point of the imaginary vector is disposed on the central axis line C2 extending in the extension direction of the second wiring body 21L through the center of the wiring width of the second wiring body 21L. Then, when viewed from the thickness direction Td, when the imaginary vector is moved from the state in which the start point of the second wiring body 21L is disposed at the first end to the second end of the central axis line C2, the number of turns is determined as 1.0 turn when the angle at which the direction of the imaginary vector is rotated is 360 degrees. However, in a case where the direction of the imaginary vector is wound a plurality of times, the number of turns is assumed to increase in a case where the imaginary vector is continuously wound in the same direction. When the imaginary vector is wound in a direction different from the direction of the previous winding, the number of turns is counted again from 0 turn. For example, when winding is performed 180 degrees clockwise and then winding is performed 180 degrees counterclockwise, 0.5 turns are obtained. In the present embodiment, the direction of the imaginary vector imaginarily disposed on the second wiring body 21L is rotated by 90 degrees at the connection portion 33. Therefore, the number of turns when the second wiring body 21L is wound is 0.25 turns. The central axis line C2 of the second wiring body 21L is a line that traces a midpoint of the second wiring body 21L in a direction orthogonal to the direction in which the second wiring body 21L extends. That is, when viewed from the thickness direction Td, the central axis line C2 of the second wiring body 21L has a substantially L shape.

As illustrated in FIG. 2, the first pad 22L is connected to the first end, of the long straight portion 31 of the second wiring body 21L, toward the first end in the longitudinal direction Ld. The first pad 22L has the same shape as the first pad 22R connected to the first wiring body 21R. That is, when viewed from the thickness direction Td, the first pad 22L has a substantially square shape. In addition, the first pad 22L is disposed line-symmetrically to the first pad 22R connected to the first wiring body 21R with respect to the symmetry axis AX.

In the first layer L1, the second support wire 42 extends from a portion, of the second pad 23R, away from the first wiring body 21R. That is, the first support wire 41 extends from the edge, of the first pad 22R, toward the first end in the longitudinal direction Ld. The first support wire 41 extends linearly in parallel with the longitudinal direction Ld. The second support wire 42 extends to a second side face 92, of the first layer L1, toward the second end in the longitudinal direction Ld and is exposed from the second side face 92. Similarly, in the first layer L1, the first support wire 41 extends from a portion, of the first pad 22L, away from the second wiring body 21L.

In the first layer L1, the second support wire 42 extends from a portion, of the second pad 23R, away from the first wiring body 21R. That is, the second support wire 42 extends from the edge, of the second pad 23R, toward the second end in the longitudinal direction Ld. The second support wire 42 extends linearly in parallel with the longitudinal direction Ld. The second support wire 42 extends to a second side face 92, of the first layer L1, toward the second end in the longitudinal direction Ld and is exposed from the second side face 92. In the present embodiment, no support wire is provided at a portion, of the second pad 23R, away from the short straight portion 32 of the second wiring body 21L.

The first inductor wire 20R and the second inductor wire 20L are made of a conductive material. In the present embodiment, the composition of the first inductor wire 20R and the second inductor wire 20L can be made of copper with a ratio of 99 wt % or more and sulfur with ratio of 0.1 wt % or more and 1.0 wt % or less (i.e., from 0.1 wt % to 1.0 wt %).

The first support wire 41 and the second support wire 42 are made of the same conductive material as the first inductor wire 20R and the second inductor wire 20L. However, part, of the first support wire 41, including an exposed face 41A exposed from the first side face 91 is made of a Cu oxide. Similarly, part, of the second support wire 42, including an exposed face 42A exposed from the second side face 92 is made of a Cu oxide.

As illustrated in FIG. 21, in the first layer L1, a region between the first inductor wire 20R and the second inductor wire 20L is the inner magnetic path portion 51. The inner magnetic path portion 51 is made of organic resin containing a metal magnetic powder. In the embodiment, the metal magnetic powder is a metal magnetic powder made of an Fe-based alloy or an amorphous alloy. More specifically, the metal magnetic powder is an FeSiCr-based metal powder containing iron. In addition, the average grain diameter of the metal magnetic powder can be about 5 micrometers.

In the embodiment, the grain diameter of the metal magnetic powder is the longest length, among line segments, drawn from an edge to an edge of a sectional shape of the metal magnetic powder appearing in a cross section when cutting the inner magnetic path portion 51. The average grain diameter is an average of grain diameters of the metal magnetic powder at random three or more points among the metal magnetic powder appearing in a cross section when cutting the inner magnetic path portion 51.

In the first layer L1, when viewed from the thickness direction Td, a region toward the second end in the short direction Wd relative to the first inductor wire 20R and a region toward the first end in the short direction Wd relative to the second inductor wire 20L are the outer magnetic path portion 52. The outer magnetic path portion 52 is made of the same magnetic material as the inner magnetic path portion 51.

In the present embodiment, the dimension in the thickness direction Td of the first layer L1, that is, the dimensions of the first inductor wire 20R, the second inductor wire 20L, the first support wire 41, and the second support wire 42 in the thickness direction Td can be approximately 40 micrometers.

When viewed from the thickness direction Td, a third layer L3 having the same rectangular shape as the second layer L2 is laminated on a lower face which is a lower face of the second layer L2 in the thickness direction Td. The second layer L2 includes two insulation resins 61 and an insulation resin magnetic layer 53.

The insulation resins 61 cover the lower faces of the first inductor wire 20R, the second inductor wire 20L, the first support wire 41, and the second support wire 42 in the thickness direction Td. When viewed from the thickness direction Td, the insulation resin 61 has a shape that covers a range slightly wider than the outer edges of the first inductor wire 20R, the second inductor wire 20L, the first support wire 41, and the second support wire 42. As a result, the one insulation resin 61 has a straight band shape. The other insulation resin 61 has a band shape extending in a substantially L shape. The insulation resin 61 is made of insulation resin, and in the embodiment, for example, can be a polyimide-based resin. The insulation resin 61 has higher insulating properties than the first inductor wire 20R and the second inductor wire 20L. The two insulation resins 61 are provided side by side in the short direction Wd corresponding to the number and arrangement of the first inductor wire 20R and the second inductor wire 20L, and are connected to each other at the ends.

In the second layer L2, a portion excluding the two insulation resins 61 is the insulation resin magnetic layer 53. The insulation resin magnetic layer 53 is made of the same magnetic material as the inner magnetic path portion 51 and the outer magnetic path portion 52 described above.

When viewed from the thickness direction Td, a third layer L3 having the same rectangular shape as the second layer L2 is laminated on a lower face which is a lower face of the second layer L2 in the thickness direction Td. The third layer L3 is a first magnetic layer 54. Therefore, the first magnetic layer 54 is disposed below the first inductor wire 20R and the second inductor wire 20L. The first magnetic layer 54 is made of an organic resin containing the metal magnetic powder same as that of the inner magnetic path portion 51, the outer magnetic path portion 52, and the insulation resin magnetic layer 53 described above.

On the other hand, when viewed from the thickness direction Td, a fourth layer L4 having the same rectangular shape as the first layer L1 is laminated on an upper face which is an upper face of the first layer L1 in the thickness direction Td. The fourth layer L4 includes two first vertical wires 71, one second vertical wire 72, and a second magnetic layer 55.

The first vertical wire 71 is directly connected to the upper faces of the first pads 22R and 22L in the first inductor wire 20R and the second inductor wire 20L without another layer interposed therebetween. That is, the first vertical wire 71, the first end of the first wiring body 21R, and the first support wire 41 are connected to the first pad 22R. The first vertical wire 71, the first end of the second wiring body 21L, and the first support wire 41 are connected to the first pad 22L. The two first vertical wires 71 are disposed in line symmetry with respect to the symmetry axis AX. The first vertical wire 71 is made of the same material as the first inductor wire 20R and the second inductor wire 20L. The second vertical wire 72 has a regular square pole shape, and the axial direction of the regular square pole coincides with the thickness direction Td.

As illustrated in FIG. 2, when viewed from the thickness direction Td, the dimension of each side of the square-shaped first vertical wires 71 is slightly smaller than the dimension of each side of the square-shaped first pads 22R and 22L. Therefore, the area of the first pads 22R and 22L is larger than the area of the first vertical wire 71 at the connection point with the first pads 22R and 22L. When viewed from above in the thickness direction Td, the central axis line CV1 of the first vertical wire 71 coincides with the geometric center of the substantially square first pads 22R and 22L. The two first vertical wires 71 are provided corresponding to the number of the first pads 22R and 22L.

As illustrated in FIG. 1, the second vertical wire 72 is directly connected to the upper face of the second pad 23R in the first inductor wire 20R without another layer interposed therebetween. That is, the second vertical wire 72, the second end of the first wiring body 21R, the second end of the second wiring body 21L, and the second support wire 42 are connected to the second pad 23R. The second vertical wire 72 is made of the same material as the first inductor wire 20R. The second vertical wire 72 has a regular square pole shape, and the axial direction of the regular square pole coincides with the thickness direction Td.

As illustrated in FIG. 2, when viewed from the thickness direction Td, the dimension of each side of the square-shaped second vertical wire 72 is slightly smaller than the dimension of each side of the square-shaped second pad 23R. Therefore, the area of the second pad 23R is larger than the area of the second vertical wire 72 at the connection point with the second pad 23R. When viewed from above in the thickness direction Td, the central axis line CV2 of the second vertical wire 72 coincides with the geometric center of the substantially square second pad 23R. The one second vertical wire 72 is provided corresponding to the number of the second pads 23R.

As illustrated in FIG. 1, a portion, of the fourth layer L4, excluding two first vertical wires 71 and one second vertical wire 72 is the second magnetic layer 55. Therefore, the second magnetic layer 55 is laminated on the upper faces of the first inductor wire 20R, the second inductor wire 20L, and the support wires 41 and 42. The second magnetic layer 55 is made of the same magnetic material as the first magnetic layer 54 described above.

In the inductor component 10, the inner magnetic path portion 51, the outer magnetic path portion 52, the insulation resin magnetic layer 53, the first magnetic layer 54, and the second magnetic layer 55 constitute a magnetic layer 50. The inner magnetic path portion 51, the outer magnetic path portion 52, the insulation resin magnetic layer 53, the first magnetic layer 54, and the second magnetic layer 55 are connected, and surround the first inductor wire 20R and the second inductor wire 20L. As described above, the magnetic layer 50 has a closed magnetic circuit for the first inductor wire 20R and the second inductor wire 20L. Therefore, the first inductor wire 20R and the second inductor wire 20L extend inside the magnetic layer 50. Although the inner magnetic path portion 51, the outer magnetic path portion 52, the insulation resin magnetic layer 53, the first magnetic layer 54, and the second magnetic layer 55 are illustrated separately, they are integrated as the magnetic layer 50, and the boundary thereof may not be confirmed.

When viewed from the thickness direction Td, a fifth layer L5 having the same rectangular shape as the fourth layer L4 is laminated on an upper face which is an upper face of the fourth layer L4 in the thickness direction Td. The fifth layer L5 includes four terminal portions 80 and an insulation layer 90. Two of the four terminal portions 80 are first external terminals 81 electrically connected to the respective first vertical wires 71. One of the four terminal portions 80 is a second external terminal 82 electrically connected to the second vertical wire 72. That is, the first external terminal 81 and the second external terminal 82 are electrically connected to the inductor wires 20R and 20L, respectively. The remaining one, of the four terminal portions 80, other than the first external terminals 81 and the second external terminal 82 is a dummy portion 83 that is not electrically connected to any of the first inductor wire 20R and the second inductor wire 20L.

As illustrated in FIG. 2, when an imaginary straight line BX passing through the center of the fifth layer L5 in the longitudinal direction Ld and parallel to the short direction Wd is drawn, a point on the upper face of the fifth layer L5 where the symmetry axis AX and the imaginary straight line BX intersect is the geometric center G of the fifth layer L5. The four terminal portions 80 are disposed at the two-fold symmetrical positions with respect to the geometric center G of the fifth layer L5 when viewed from the thickness direction Td.

The first external terminal 81 is directly connected to the upper face of the first vertical wire 71 without another layer interposed therebetween. When viewed from the thickness direction Td, the second external terminal 82 has a rectangular shape and is located on the second magnetic layer 55. The area in which the first external terminal 81 is in contact with the first vertical wire 71 is less than or equal to half the whole area of the first external terminal 81. The rectangular long side of the second external terminal 82 extends in parallel with the longitudinal direction Ld of the fifth layer L5, and the short side extends in parallel with the short direction Wd of the fifth layer L5. The two first external terminals 81 are provided corresponding to the number of the first vertical wires 71.

The second external terminal 82 is directly connected to the upper face of the second vertical wire 72 without another layer interposed therebetween. The area in which the second external terminal 82 is in contact with the second vertical wire 72 is less than or equal to half the whole area of the second external terminal 82. When viewed from the thickness direction Td, the second external terminal 82 has a rectangular shape and is located on the second magnetic layer 55. The rectangular long side of the second external terminal 82 extends in parallel with the longitudinal direction Ld of the fifth layer L5, and the short side extends in parallel with the short direction Wd of the fifth layer L5.

Figure 3:
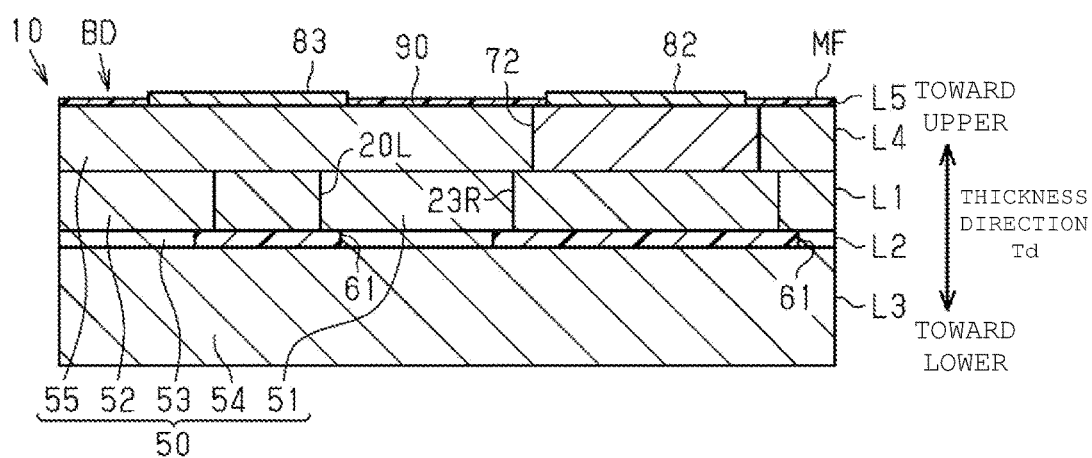
FIG. 3 is a sectional view of the inductor component taken along line 3-3 in FIG. 2.

As illustrated in FIG. 3, the dummy portion 83 is disposed on the upper face of the second magnetic layer 55 of the fourth layer L4. As illustrated in FIG. 2, when viewed from the thickness direction Td, the dummy portion 83 has a different shape from the first external terminal 81 and the second external terminal 82. In the present embodiment, the dummy portion 83 has an elliptical shape when viewed from the thickness direction Td. The shape of the dummy portion 83 is not limited this, and may be, for example, a rectangular shape, a circular shape, or the like as long as the shape is different from those of the first external terminal 81 and the second external terminal 82. The major axis of the ellipse of the dummy portion 83 extends in parallel with the longitudinal direction Ld of the fifth layer L5, and the minor axis extends parallel to the short direction Wd of the fifth layer L5.

When viewed from the thickness direction Td, most of the dummy portion 83 overlaps the second inductor wire 20L. More specifically, when viewed from the thickness direction Td, the dummy portion 83 is disposed at a position at which it overlaps the connection portion 33 in the second inductor wire 20L. When viewed from the thickness direction Td, the area of the dummy portion 83 is equal to the area of each of the first external terminal 81 and the second external terminal 82. In the present embodiment, "the same area" allows manufacturing errors. Therefore, when the difference in area between the dummy portion 83 and the first external terminal 81 and the second external terminal 82 is within ±10%, it can be considered that the areas are the same.

A portion, of the fifth layer L5, excluding the terminal portion 80 is the insulation layer 90. In other words, a range of a portion, of the upper face of the fourth layer L4, that is not covered with the two first external terminals 81, the one second external terminal 82, and the one dummy portion 83 is covered with the insulation layer 90 of the fifth layer L5. The insulation layer 90 has higher insulating properties than the magnetic layer 50, and in the present embodiment, the insulation layer 90 is a solder resist. The dimension of the insulation layer 90 in the thickness direction Td is smaller than the dimension of the terminal portion 80 in the thickness direction Td.

In the present embodiment, the magnetic layer 50, the insulation resin 61, and the insulation layer 90 constitute an element body BD. That is, the element body BD has a rectangular shape when viewed from the thickness direction Td. In the present embodiment, the dimension of the element body BD in the thickness direction Td can be about 0.2 mm.

Of the surface of the element body BD, an upper face of the insulation layer 90 in the thickness direction Td is the main face MF. Therefore, the first inductor wire 20R and the second inductor wire 20L extend in parallel with the main face MF of the element body BD. The first vertical wire 71 extends in the thickness direction Td from the first pad 22R of the first inductor wire 20R toward the main face MF. The first vertical wire 71 is exposed from the main face MF. The first vertical wire 71 extends in the thickness direction Td from the first pad 22L of the second inductor wire 20L toward the main face MF. The first vertical wire 71 is exposed from the main face MF. A second vertical wire 72 extends in the thickness direction Td from the second pad 23R of the first inductor wire 20R toward the main face MF. The second vertical wire 72 is exposed from the main face MF. The upper face of the terminal portion 80 is exposed from the main face MF and is located above the main face MF in the thickness direction Td. That is, the outer edge of each terminal portion 80 including the dummy portion 83 is in contact with the insulation layer 90. As in the present embodiment, at least part of the respective faces, of the first vertical wire 71 and the second vertical wire 72, exposed from the main face MF may be covered with the first external terminal 81 and the second external terminal 82, respectively.

The element body BD has a first side face 93 perpendicular to the main face MF. The first side face 91 of the first layer L1 is part of the first side face 93 of the element body BD. The element body BD has a second side face 94 which is a side face perpendicular to the main face MF and is parallel to the first side face 93. The second side face 92 of the first layer L1 is part of the second side face 94 of the element body BD. That is, the first support wire 41 extends from the first inductor wire 20R in parallel with the main face MF, and has an end exposed from the first side face 93 of the element body BD. Similarly, the second support wire 42 extends from the first inductor wire 20R in parallel with the main face MF, and has an end exposed from the second side face 94 of the element body BD.

In the present embodiment, the geometric center G of the fifth layer L5 coincides with the geometric center G of the main face MF. When viewed from the thickness direction Td, the geometric center G of the main face MF and the geometric center G of the element body BD coincide with each other. In the present embodiment, the main face MF has a two-fold symmetrical shape with respect to the geometric center G of the main face MF. The shape of the outer edge of the main face MF may be a two-fold symmetrical shape with respect to the geometric center G, and the shape of the main face MF in the thickness direction Td is not considered. For example, the opening in which the terminal portion 80 of the main face MF is disposed may not have a two-fold symmetrical shape with respect to the geometric center G.

As illustrated in FIG. 2, it is assumed that the main face MF is imaginarily divided into a first region and a second region by the imaginary straight line BX that passes through the geometric center G of the main face MF and is parallel to one side of the main face MF in the short direction Wd. In the present embodiment, when a region toward the first end in the longitudinal direction Ld relative to the imaginary straight line BX is defined as a first region, the dummy portion 83 is not provided in the first region. When a region toward the second end in the longitudinal direction Ld relative to the imaginary straight line BX is defined as a second region, the dummy portions 83 whose number is the same as the number of the second external terminals 82 provided in the second region are provided in the second region. It is assumed that an imaginary straight line is drawn at a position passing through the geometric center G of the main face MF and parallel to one side in the longitudinal direction Ld of the main face MF, that is, at the same position as the symmetry axis AX, and the main face MF is imaginarily divided into the first region and the second region. For example, when a region toward the second end in the short direction Wd relative to the imaginary straight line located at the same position as the symmetry axis AX is defined as the first region, the dummy portion 83 is not provided in the first region. When a region toward the first end in the short direction Wd relative to the imaginary straight line located at the same position as the symmetry axis AX is defined as the second region, the dummy portions 83 whose number is the same as that of the first external terminals 81 are provided in the second region. However, in a case where there is a plurality of imaginary straight lines that passes through the geometric center and is parallel to one side of the main face, the dummy portion may not be provided in the first region when the main face is imaginarily divided by one of the imaginary straight lines, but the dummy portion whose number is equal to or more than the number of the external terminals provided in the second region may be provided in the second region.

In addition, the number of dummy portions 83 provided in the present embodiment is one, and the dummy portions are disposed at positions that are not two-fold symmetric with respect to the geometric center G of the main face MF when viewed from the thickness direction Td.

Here, as illustrated in FIG. 2, it is assumed that the main face MF is divided into a plurality of mutually congruent imaginary regions whose number is the same as the number of the terminal portions 80 by the imaginary straight line BX and the symmetry axis AX when viewed from the thickness direction Td. That is, it is assumed that the main face MF is divided into four rectangular imaginary regions by the imaginary straight line BX and the symmetry axis AX. At this time, one terminal portion 80 is disposed in each of the four imaginary regions.

Specifically, an imaginary region toward the first end in the longitudinal direction Ld relative to the imaginary straight line BX and toward the second end in the short direction Wd relative to the symmetry axis AX is defined as a first imaginary region VA1. The first external terminal 81 of the terminal portion 80 is provided in the first imaginary region VA1. An imaginary region toward the second end in the longitudinal direction Ld relative to the imaginary straight line BX and toward the second end in the short direction Wd relative to the symmetry axis AX is defined as a second imaginary region VA2. The second external terminal 82 is provided in the second imaginary region VA2. An imaginary region toward the first end in the longitudinal direction Ld relative to the imaginary straight line BX and toward the first end in the short direction Wd relative to the symmetry axis AX is defined as a third imaginary region VA3. The first external terminal 81 is disposed in the third imaginary region VA3. An imaginary region toward the second end in the longitudinal direction Ld relative to the imaginary straight line BX and toward the first end in the short direction Wd relative to the symmetry axis AX is defined as a fourth imaginary region VA4. The dummy portion 83 is provided in the fourth imaginary region VA4.

The dummy portion 83 provided in the fourth imaginary region VA4 is defined as a specific dummy portion 83S, and the terminal portion 80 provided in an imaginary region at the two-fold symmetrical position about the geometric center G of the main face MF in the fourth imaginary region VA4 where the specific dummy portion 83S is provided is defined as a specific terminal portion 80S. That is, the specific terminal portion 80S is the first external terminal 81 provided in the first imaginary region VA1. When viewed from the thickness direction Td, the shape of the specific dummy portion 83S is an elliptical shape and is different from the shape of the specific terminal portion 80S.

Next, each wire will be described in detail.

As illustrated in FIG. 2, when viewed from the thickness direction Td, the central axis line C1 of the first wiring body 21R extends in the longitudinal direction Ld. The central axis line C1 of the first wiring body 21R is a line that traces a midpoint of the first wiring body 21R in a direction orthogonal to the direction in which the first wiring body 21R extends, that is, in the short direction Wd.

As described above, the central axis line C2 of the second wiring body 21L of the second inductor wire 20L extends in a substantially L shape. Here, the wiring length of the long straight portion 31 of the second wiring body 21L is longer than the wiring length of the first wiring body 21R. In addition, the second wiring body 21L has a connection portion 33 and a short straight portion 32. Therefore, the wiring length of the second wiring body 21L is longer than the wiring length of the first wiring body 21R. Specifically, the wiring length of the second wiring body 21L is 1.2 times or more the wiring length of the first wiring body 21R.

The inductance value of the second inductor wire 20L is 1.1 times or more the inductance value of the first inductor wire 20R, reflecting the difference in the wiring length. In the present embodiment, the inductance value of the first inductor wire 20R can be approximately 2.5 nH.

The first wiring body 21R of the first inductor wire 20R extends along one side of the outer edge of the element body BD in the longitudinal direction Ld. The first pad 22L and the second pad 23R of the second inductor wire 20L are disposed at the symmetrical position with respect to the geometric center G of the element body BD. In the present embodiment, the first pad 22L and the second pad 23R of the second inductor wire 20L are disposed at the two-fold symmetrical positions about the geometric center G.

The first inductor wire 20R has a parallel portion extending in parallel with the second inductor wire 20L. Specifically, the first wiring body 21R and the long straight portion 31 of the second wiring body 21L correspond to parallel portions. The first wiring body 21R and the long straight portion 31 are disposed side by side in the short direction Wd in the first layer L1. The parallel portions may be substantially parallel, and a manufacturing error is allowed.

In the following description, a distance between the central axis line C1 of the first wiring body 21R in the short direction Wd and the central axis line C2 of the long straight portion 31 of the second wiring body 21L is defined as a pitch X1 between the wiring bodies. That is, the pitch between the wiring bodies is a pitch between adjacent parallel portions.

In addition, the interval between the adjacent parallel portions, that is, the distance between the end, of the first wiring body 21R, toward the first end in the short direction Wd and the end, of the long straight portion 31 of the second wiring body 21L, toward the second end in the short direction Wd in FIG. 2 is, for example, about 200 micrometers.

As illustrated in FIG. 2, the distance from the central axis line C1 of the first wiring body 21R, which is a parallel portion located toward the second end in the short direction Wd, to the end, of the element body BD, closest to the first wiring body 21R in the short direction Wd, that is, the end toward the second end, is defined as a first distance Y1.

The distance from the central axis line C2 of the long straight portion 31, which is a parallel portion located toward the first end in the short direction Wd, to the end, of the element body BD, closest to the long straight portion 31 in the short direction Wd, that is, the end toward the first end, is defined as a second distance Y2. In the present embodiment, the first distance Y1 has the same dimension as the second distance Y2.

In the short direction Wd, the pitch X1 between the wiring bodies is different in dimension from the first distance Y1 and the second distance Y2. Specifically, the pitch X1 between the wiring bodies can be approximately "250 micrometers". Each of the first distance Y1 and the second distance Y2 can be approximately "175 micrometers". Each of the first distance Y1 and the second distance Y2 is preferably slightly larger than half the pitch X1.

In the present embodiment, the average value of the pitch X1, the first distance Y1, and the second distance Y2 is "200 micrometers". The ratio of the pitch X1 to the average value is "125%". The ratio of the first distance Y1 and the second distance Y2 to the average value is "87.5%". Therefore, the ratio of the pitch X1, the first distance Y1, and the second distance Y2 to the average value is 50% or more and 150% or less (i.e., from 50% to 150%).

The central axis line A1 of the first support wire 41 connected to the first pad 22R of the first inductor wire 20R extends in the longitudinal direction Ld. The central axis line A1 of the first support wire 41 is a line that traces a midpoint of the first support wire 41 in a direction orthogonal to the direction in which the first support wire 41 extends, that is, in the short direction Wd.

The central axis line A1 of the first support wire 41 is located outward in the short direction Wd relative to the central axis line C1 of the first wiring body 21R. That is, the central axis line A1 of the first support wire 41 connected to the first inductor wire 20R and the central axis line C1 of the first wiring body 21R are located on different straight lines.

The extension line of the central axis line A1 of the first support wire 41 passes through the central axis line CV1 of the first vertical wire 71. That is, the extension line of the central axis line A1 of the first support wire 41 passes through the center of the connection face between the first vertical wire 71 and the first pad 22R.

The central axis line A1 of the first support wire 41 connected to the first pad 22L of the second inductor wire 20L extends in the longitudinal direction Ld. The central axis line A2 of the second support wire 42 is a line that traces a midpoint of the second support wire 42 in the direction orthogonal to the direction in which the second support wire 42 extends, that is, in the short direction Wd.

The central axis line A1 of the first support wire 41 is located outward in the short direction Wd relative to the central axis line C2 of the second wiring body 21L. That is, the extension line of the central axis line A1 of the first support wire 41 connected to the second inductor wire 20L and the central axis line C2 of the second wiring body 21L are located on different straight lines.

The extension line of the central axis line A1 of the first support wire 41 passes through the central axis line CV1 of the first vertical wire 71. That is, the extension line of the central axis line A1 of the first support wire 41 passes through the center of the connection face between the first vertical wire 71 and the first pad 22L.

The first support wire 41 connected to the first inductor wire 20R and the first support wire 41 connected to the second inductor wire 20L are disposed in line symmetry with respect to the symmetry axis AX.

The central axis line A2 of the second support wire 42 extends in the longitudinal direction Ld. The central axis line A2 of the second support wire 42 is a line that traces a midpoint of the second support wire 42 in the direction orthogonal to the direction in which the second support wire 42 extends, that is, in the short direction Wd.

The central axis line A2 of the second support wire 42 is located outward in the short direction Wd relative to the central axis line C1 of the first wiring body 21R. That is, the central axis line A2 of the second support wire 42 and the central axis line C1 of the first wiring body 21R are located on different straight lines.

The second vertical wire 72 is disposed on the central axis line A2 of the second support wire 42. The extension line of the central axis line A2 of the second support wire 42 passes through the central axis line CV2 of the second vertical wire 72. That is, the extension line of the central axis line A2 of the second support wire 42 passes through the center of the connection face between the second vertical wire 72 and the second pad 23R.

The first support wire 41 and the second support wire 42 extending from the first inductor wire 20R are disposed at the same position in the short direction Wd. That is, the central axis line A1 of the first support wire 41 and the central axis line A2 of the second support wire 42 are located on the same straight line. When a deviation is within 10% based on the minimum line width of the first inductor wire 20R and the second inductor wire 20L, they are regarded as being on the same straight line. Specifically, the minimum line width of the first inductor wire 20R and the second inductor wire 20L in the present embodiment can be 50 micrometers, which is the line width of the first wiring body 21R and the second wiring body 21L. Therefore, "on the same straight line" in the present embodiment is a case where the shortest distance between the two axis lines is within 5 micrometers, and "on different straight lines" is a case where the shortest distance between the two axis lines exceeds 5 micrometers.

As described above, in the first layer L1, the respective first support wires 41 are disposed in line symmetry with respect to the symmetry axis AX. Therefore, as illustrated in FIG. 2, a distance Q1 from the end of the element body BD toward the second end in the short direction Wd to the central axis line A1 of the first support wire 41 extending from the first inductor wire 20R is the same as a distance Q2 from the end of the element body BD toward the first end in the short direction Wd to the central axis line A1 of the first support wire 41 extending from the second inductor wire 20L.

On the other hand, in the short direction Wd, the pitch P1 from the central axis line A1 of the first support wire 41 extending from the first inductor wire 20R to the central axis line A1 of the first support wire 41 extending from the second inductor wire 20L is larger than each of the above-described distance Q1 and distance Q2. Specifically, the pitch P1 is about twice each of the distance Q1 and the distance Q2.

Figure 4:
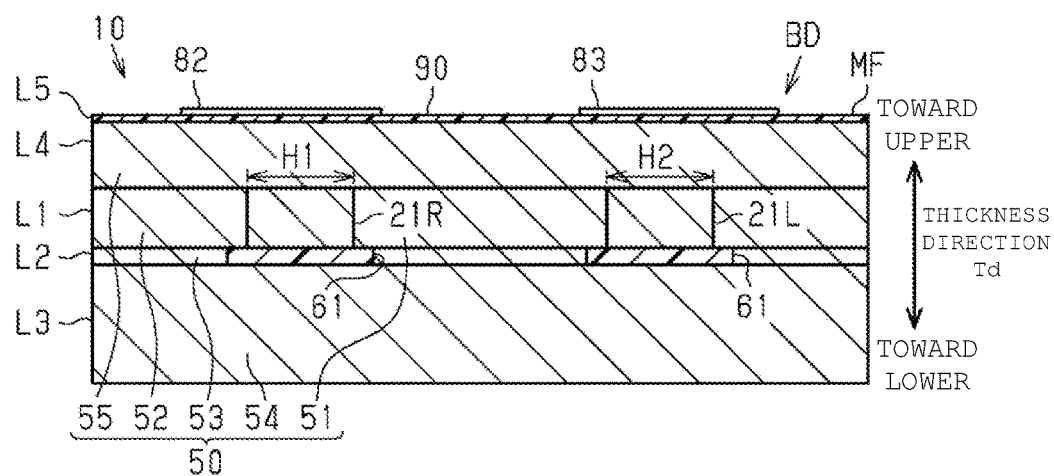
FIG. 4 is a sectional view of the inductor component taken along line 4-4 in FIG. 2.

As illustrated in FIG. 4, the wiring width H1 of the first wiring body 21R in the short direction Wd is equal to the wiring width H2 of the second wiring body 21L in the short direction Wd. In addition, since the first inductor wire 20R and the second inductor wire 20L are disposed in the same first layer L1, the dimensions of the first wiring body 21R and the second wiring body 21L in the thickness direction Td are also the same. Therefore, the sectional area of the first wiring body 21R in the cross section orthogonal to the central axis line C1 of the first wiring body 21R is equal to the sectional area of the second wiring body 21L. In the present embodiment, when the difference in sectional area between the first wiring body 21R and the second wiring body 21L is 10% or less with respect to the sectional area of each of the wiring bodies 21R, 21L, it is considered that the sectional areas are equal.

Figure 5:
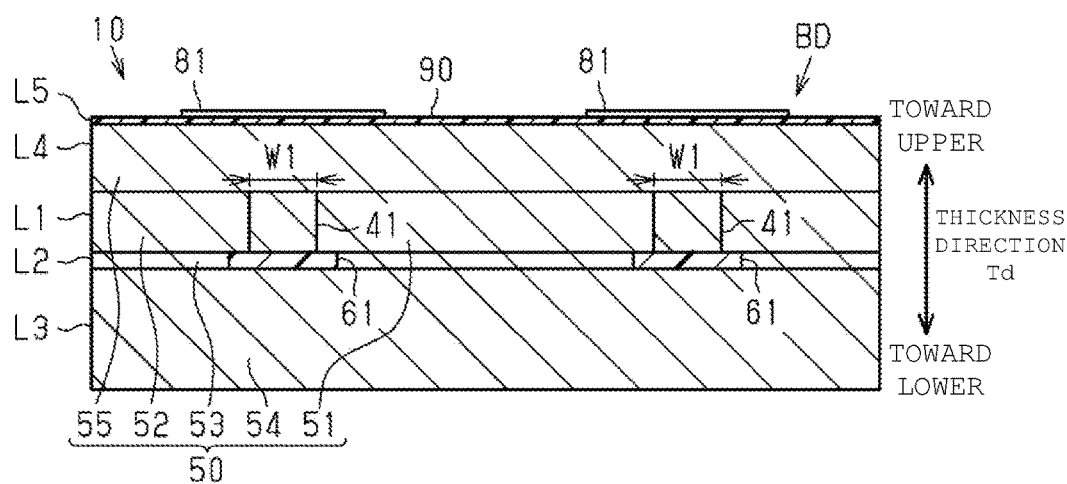
FIG. 5 is a sectional view of the inductor component taken along line 5-5 in FIG. 2.

As illustrated in FIGS. 4 and 5, the wiring width W1 of the first support wire 41 in the short direction Wd is smaller than the wiring width H1 of the first wiring body 21R in the short direction Wd. Here, the first support wire 41 and the first wiring body 21R are provided in the same first layer L1, and the dimensions in the thickness direction Td are substantially the same. Therefore, the sectional area of each of the first support wires 41 is smaller than the sectional area of the first wiring body 21R by reflecting the difference in wiring width.

Similarly, as illustrated in FIGS. 2 and 4, the wiring width W2 of the second support wire 42 in the short direction Wd is smaller than the wiring width H1 of the first wiring body 21R in the short direction Wd. Therefore, the sectional area of the second support wire 42 is smaller than the sectional area of the first wiring body 21R by reflecting the difference in the wiring width.

Figure 6:
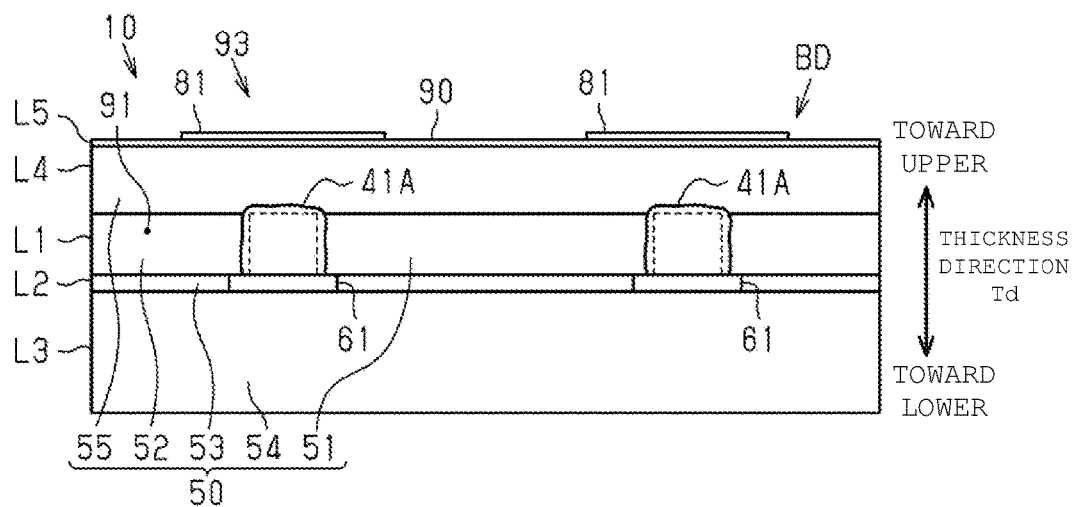
FIG. 6 is a side view illustrating a first side face of the inductor component.

As illustrated in FIG. 6, ends of the two first support wires 41 are exposed from the first side face 93, of the element body BD, toward the first end in the longitudinal direction Ld. The shape of the exposed face 41A of each first support wire 41 exposed from the first side face 93 is a shape obtained by slightly extending the sectional shape of the first support wire 41 orthogonal to the central axis line A1. As a result, the area of the exposed face 41A of the first support wire 41 is larger than the sectional area of the first support wire 41 inside the element body BD in the cross section orthogonal to the central axis line A1. Similarly, the second support wire 42 is exposed from the second side face 94, of the element body BD, toward the second end in the longitudinal direction Ld. The area of the exposed face 42A of the second support wire 42 exposed from the second side face 94 is larger than the sectional area of the second support wire 42 inside the element body BD in the cross section orthogonal to the central axis line A2. As a result, the contact areas of the first support wire 41 and the second support wire 42 with the first side face 93 and the second side face 94 of the element body BD are increased, and the adhesion therebetween is improved. The magnitude of the sectional area only is required to satisfy the above relationship, and for example, the exposed face 41A may have a shape in which one side is extended and the other side is covered with the extended portion of the element body BD.

The number of the first support wires 41 exposed from the first side face 93 is two, the number of the second support wires 42 exposed from the second side face 94 is one, and the number of the exposed support wires is different.

Next, the terminal portion 80 will be described in detail.

The four terminal portions 80 include, for example, a plurality of conductive layers. In the present embodiment, as shown in FIG. 21, the first external terminal 81 has a three-layer structure of a first metal layer 111, a second metal layer 112, and a third metal layer 113. The first metal layer 111 is laminated on the upper faces of the first vertical wires 71 and the second magnetic layer 55. The dimension of the first metal layer 111 in the thickness direction Td can be approximately 5 micrometers. The first metal layer 111 is made of copper. The second metal layer 112 is laminated on the upper face of the first metal layer 111. The dimension of the second metal layer 112 in the thickness direction Td can be approximately 5 micrometers. The second metal layer 112 is made of nickel. The third metal layer 113 is laminated on the upper face of the second metal layer 112. The dimension of the third metal layer 113 in the thickness direction Td can be approximately 0.1 micrometers. The third metal layer 113 is made of gold. The second external terminal 82 and the dummy portion 83 have the same laminated structure as the first external terminal 81.

When viewed from the thickness direction Td, the second magnetic layer 55 and the first vertical wire 71 existing on the lower face of the first external terminal 81 in the thickness direction Td may be seen through. Therefore, appearance looks different depending on whether the second magnetic layer 55 or the first vertical wire 71 is present on the lower face of the first external terminal 81. When viewed from the thickness direction Td, a region, of the second vertical wire 72, which can be seen through the second external terminal 82 is a region equal to or less than half the second external terminal 82.

Similarly, the second magnetic layer 55 and the second vertical wire 72 existing on the lower face of the second external terminal 82 in the thickness direction Td may be seen through. Therefore, appearance looks different depending on whether the second magnetic layer 55 or the second vertical wire 72 is present on the lower face of the second external terminal 82. When viewed from the thickness direction Td, a region, of the second vertical wire 72, which can be seen through the second external terminal 82 is a region equal to or less than half the second external terminal 82.

The second magnetic layer 55 existing on the lower face of the dummy portion 83 in the thickness direction Td may be seen through. The dummy portion 83 is not provided on the vertical wire. Therefore, in the embodiment, appearance as a whole looks uniform for the dummy portion 83. On the other hand, the region, of the second magnetic layer 55, which can be seen through the first external terminal 81 is a region equal to or more than half the first external terminal 81. The region, of the second magnetic layer 55, which can be seen through the second external terminal 82 is a region equal to or more than half the second external terminal 82. That is, when viewed from the thickness direction Td, the whole dummy portion 83 and half or more of the region of each of the first external terminal 81 and the second external terminal 82 have optically the same color. Here, the same color refers to a color when, for example, a difference between numerical values indicating RGB falls within a predetermined range when a color difference meter is used. The predetermined range is, for example, 10%.

As shown in FIG. 21, a recess 120, of the first external terminal 81, recessed downward in the thickness direction Td is provided on the first vertical wire 71 when viewed from the thickness direction Td. The recess 120 is recessed by, for example, several micrometers from the upper face of the first external terminal 81 in the thickness direction Td.

As shown in FIG. 21, the surface of the first external terminal 81 is composed of a smooth portion 121 and a rough portion 122 having surface roughness larger than that of the smooth portion 121. In the present embodiment, the surface roughness of the rough portion 122 is about 1.5 times larger than the surface roughness of the smooth portion 121. The surface roughness can be measured using a light interference type surface roughness meter (NewView manufactured by ZYGO).

The smooth portion 121 of the first external terminal 81 has a small surface roughness by reflecting that the upper face of the first vertical wire 71 in the thickness direction Td is flat. Therefore, when viewed from the thickness direction Td, the smooth portion 121 is provided on the first vertical wire 71 of the first external terminal 81. The whole smooth portion 121 is formed on the recess 120. In addition, the rough portion 122 of the first external terminal 81 has a large surface roughness by reflecting that the surface of the magnetic layer 50 is uneven due to the metal magnetic powder contained in the magnetic layer 50. Therefore, when viewed from the thickness direction Td, the rough portion 122 is provided on the second magnetic layer 55 of the first external terminal 81.

As in the first external terminal 81 described above, in the second external terminal 82, the recess 120 is recessed. The surface of the second external terminal 82 is composed of the smooth portion 121 and the rough portion 122 having surface roughness larger than that of the smooth portion 121.

When viewed from the thickness direction Td, the smooth portion 121 of the second external terminal 82 is provided on the second vertical wire 72 of the second external terminal 82. That is, the whole recess 120 has the smooth portion 121 thereon. When viewed from the thickness direction Td, the rough portion 122 of the second external terminal 82 is provided on the second magnetic layer 55 of the second external terminal 82.

As described above, the whole region of the dummy portion 83 is provided on the second magnetic layer 55. Therefore, the surface roughness of the dummy portion 83 is substantially the same as those of the rough portion 122 of the first external terminal 81 and of the rough portion 122 of the second external terminal 82. Therefore, the surface roughness of the dummy portion 83 is larger than those of the smooth portion 121 of the first external terminal 81 and the smooth portion 121 of the second external terminal 82.

Next, a method of manufacturing the inductor component 10 will be described.

Figure 7:
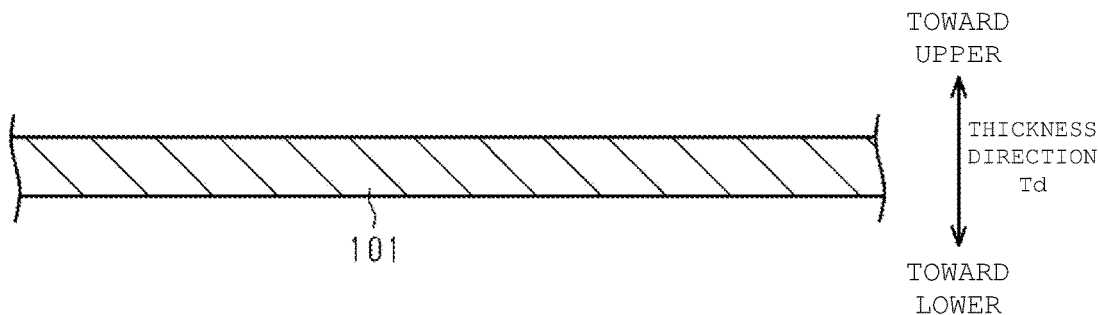
FIG. 7 is an explanatory diagram of a method of manufacturing the inductor component.

As shown in FIG. 7, first, a base member preparation step is performed. Specifically, the plate-shaped base member 101 is prepared. The base member 101 is made of ceramics. The base member 101 has a quadrangular shape when viewed from the thickness direction Td. The dimension of each side is a dimension in which a plurality of the inductor components 10 is accommodated. In the following description, a direction orthogonal to the plane direction of the base member 101 will be described as the thickness direction Td.

Figure 8:
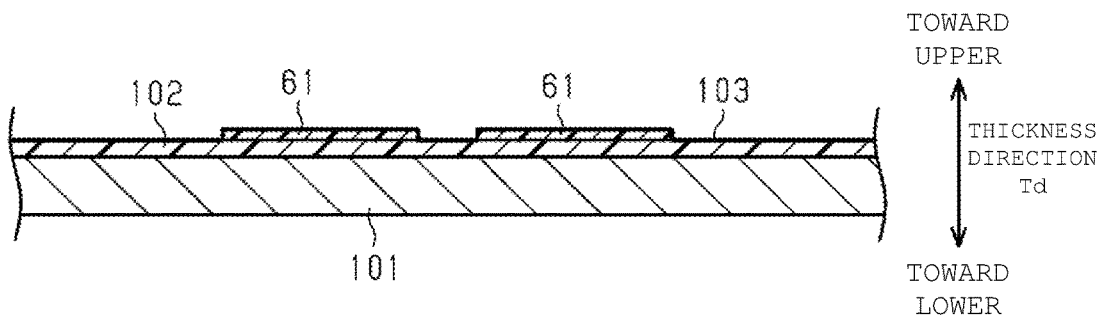
FIG. 8 is an explanatory diagram of a method of manufacturing the inductor component.

Next, as illustrated in FIG. 8, a dummy insulation layer 102 is applied to the whole upper face of the base member 101. Next, when viewed from the thickness direction Td, the insulation resin 61 is patterned by photolithography in a range slightly wider than the range in which the first inductor wire 20R and the second inductor wire 20L are disposed.

Next, a seed layer forming step of forming a seed layer 103 is performed. Specifically, the copper seed layer 103 is formed on the upper faces of the insulation resin 61 and the dummy insulation layer 102 by performing sputtering from the upper face side of the base member 101. In the drawings, the seed layer 103 is indicated by a thick line.

Figure 9:
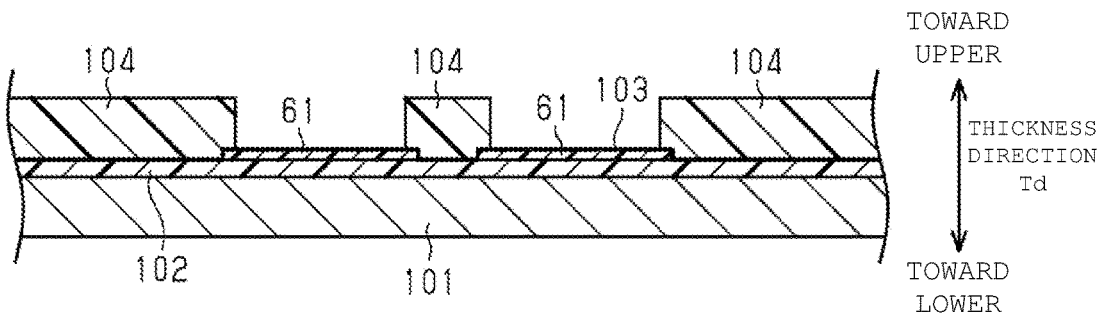
FIG. 9 is an explanatory diagram of a method of manufacturing the inductor component.

Next, as illustrated in FIG. 9, a first coating step of forming a first coating portion 104 that coats a portion, of the upper face of the seed layer 103, where the first inductor wire 20R, the second inductor wire 20L, the first support wire 41, and the second support wire 42 are not formed. Specifically, first, a photosensitive dry film resist is applied to the whole upper face of the seed layer 103. Next, the whole range of the upper face of the dummy insulation layer 102 and the upper face of the outer edge portion, of the upper face of the insulation resin 61, in the range covered by the insulation resin 61 are solidified by exposure. Thereafter, an unsolidified portion of the applied dry film resist is removed with a chemical solution. As a result, a solidified portion of the applied dry film resist is formed as the first coating portion 104. On the other hand, the seed layer 103 is exposed in a portion, of the applied dry film resist, which is removed by the chemical solution and is not coated with the first coating portion 104. The thickness of the first coating portion 104, which is the dimension of the first coating portion 104 in the thickness direction Td, is slightly larger than the thicknesses of the first wiring body 21R of the first inductor wire 20R and the second wiring body 21L of the second inductor wire 20L of the inductor component 10 illustrated in FIG. 4. Photolithography in other steps to be described later is a similar step, and thus a detailed description thereof will be omitted.

Figure 10:
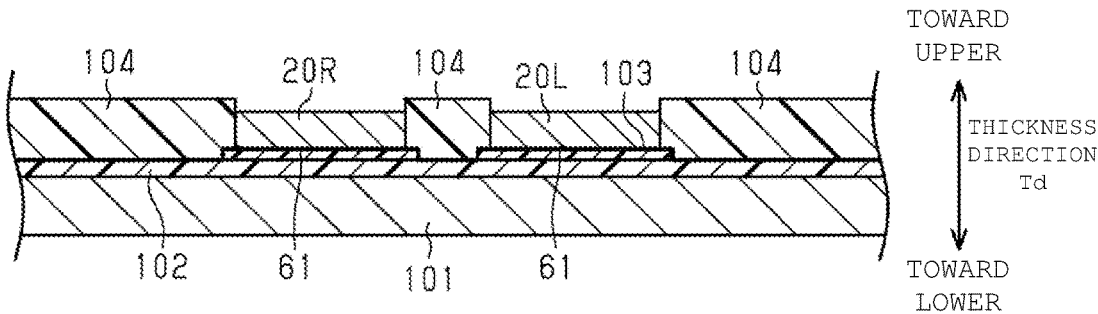
FIG. 10 is an explanatory diagram of a method of manufacturing the inductor component.

Next, as illustrated in FIG. 10, a wiring processing step of forming the first inductor wire 20R, the second inductor wire 20L, the first support wire 41, and the second support wire 42 by electrolytic plating in a portion, of the upper face of the insulation resin 61, that is not coated with the first coating portion 104. Specifically, electrolytic copper plating is performed to grow copper from a portion from which the seed layer 103 is exposed on the upper face of the insulation resin 61. As a result, the first inductor wire 20R, the second inductor wire 20L, the first support wire 41, and the second support wire 42 are formed. Therefore, in the embodiment, the step of forming the plurality of inductor wires and the step of forming the plurality of first support wires 41 and the plurality of second support wires 42 that connect pads of different inductor wires are the same step. The first inductor wire 20R, the second inductor wire 20L, the first support wire 41, and the second support wire 42 are formed on the same plane. In FIG. 10, the first inductor wire 20R and the second inductor wire 20L are illustrated, and the support wires 41 and 42 are not illustrated.

Figure 11:
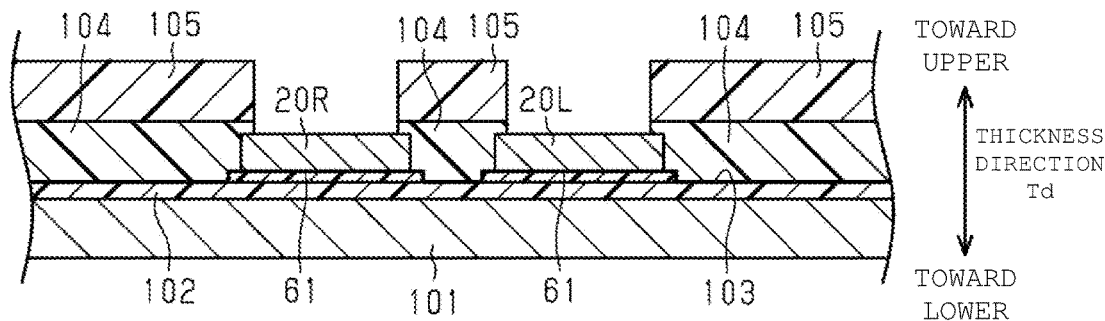
FIG. 11 is an explanatory diagram of a method of manufacturing the inductor component.

Next, as illustrated in FIG. 11, a second coating step of forming a second coating portion 105 is performed. The range in which the second coating portion 105 is formed is a range, of the whole upper face of the first coating portion 104, the whole upper face of each support wire, and the upper faces of the first inductor wire 20R and the second inductor wire 20L, in which the first vertical wire 71 and the second vertical wire 72 are not formed. The second coating portion 105 is formed in this range by the same photolithography as the method of forming the first coating portion 104. The dimension of the second coating portion 105 in the thickness direction Td is the same as that of the first coating portion 104.

Next, a wiring processing step of forming each of the vertical wires 71 and 72 is performed. Specifically, the first vertical wire 71 and the second vertical wire 72 are formed by electrolytic copper plating on a portion, of the first inductor wire 20R and the second inductor wire 20L, that is not coated with the second coating portion 105. In the vertical wiring processing step, the upper end of the growing copper is set to be slightly lower than the upper face of the second coating portion 105. Specifically, the dimension of each of the vertical wires 71 and 72 in the thickness direction Td before cutting described later is set to be the same as the dimension of each of the inductor wires 20R and 20L in the thickness direction Td.

Figure 12:
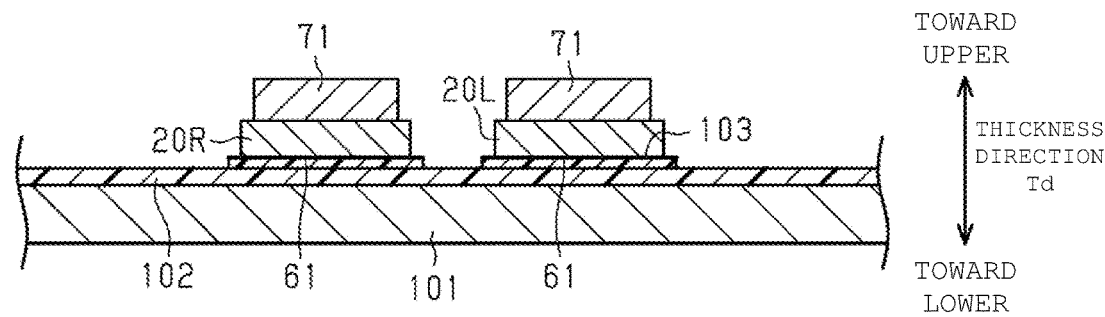
FIG. 12 is an explanatory diagram of a method of manufacturing the inductor component.

Next, as illustrated in FIG. 12, a coating portion removing step of removing the first coating portion 104 and the second coating portion 105 is performed. Specifically, the first coating portion 104 and the second coating portion 105 are removed by wet etching the first coating portion 104 and the second coating portion 105 with a chemical. In FIG. 12, the first vertical wire 71 is illustrated, and the second vertical wire 72 is not illustrated.

Next, a seed layer etching step of etching the seed layer 103 is performed. The exposed seed layer 103 is removed by etching the seed layer 103. As described above, each inductor wire and each support wire are formed by a semi additive process (SAP).

Figure 13:
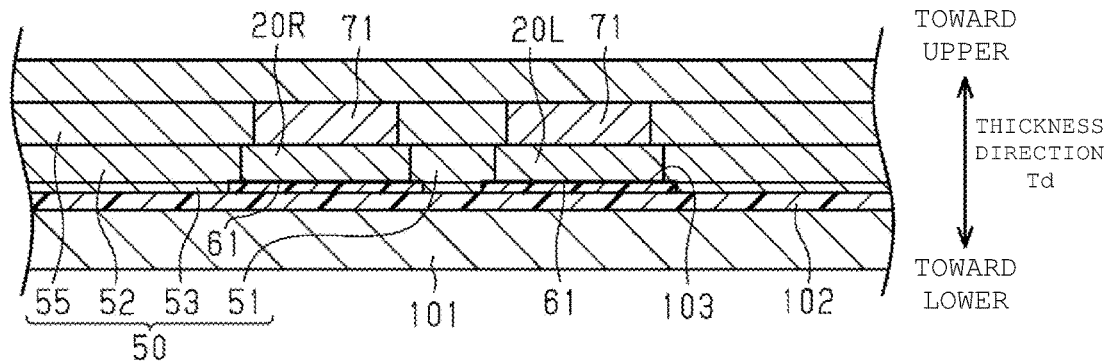
FIG. 13 is an explanatory diagram of a method of manufacturing the inductor component.

Next, as illustrated in FIG. 13, a second magnetic layer processing step of laminating the inner magnetic path portion 51, the outer magnetic path portion 52, the insulation resin magnetic layer 53, and the second magnetic layer 55 is performed. Specifically, first, a resin containing the magnetic powder, which is the material of the magnetic layer 50, is applied to the upper face of the base member 101. At this time, the resin containing the magnetic powder is applied so as to cover the upper faces of the vertical wires 71 and 72. Next, the resin containing the magnetic powder is hardened by press working to form the inner magnetic path portion 51, the outer magnetic path portion 52, the insulation resin magnetic layer 53, and the second magnetic layer 55 on the upper face of the base member 101.

Figure 14:
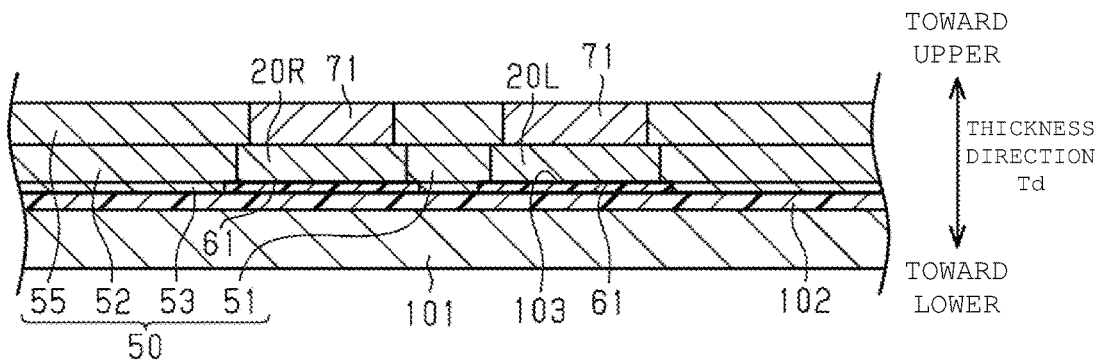
FIG. 14 is an explanatory diagram of a method of manufacturing the inductor component.

Next, as illustrated in FIG. 14, the upper portion of the second magnetic layer 55 is scraped until the upper faces of the vertical wires 71 and 72 are exposed. At this time, the second magnetic layer 55 is scraped such that the upper face of the second magnetic layer 55 is located above the upper faces of the vertical wires 71 and 72 in the thickness direction Td. The inner magnetic path portion 51, the outer magnetic path portion 52, the insulation resin magnetic layer 53, and the second magnetic layer 55 are integrally formed, but in the drawing, the inner magnetic path portion 51, the outer magnetic path portion 52, the insulation resin magnetic layer 53, and the second magnetic layer 55 are illustrated separately.

Figure 15:
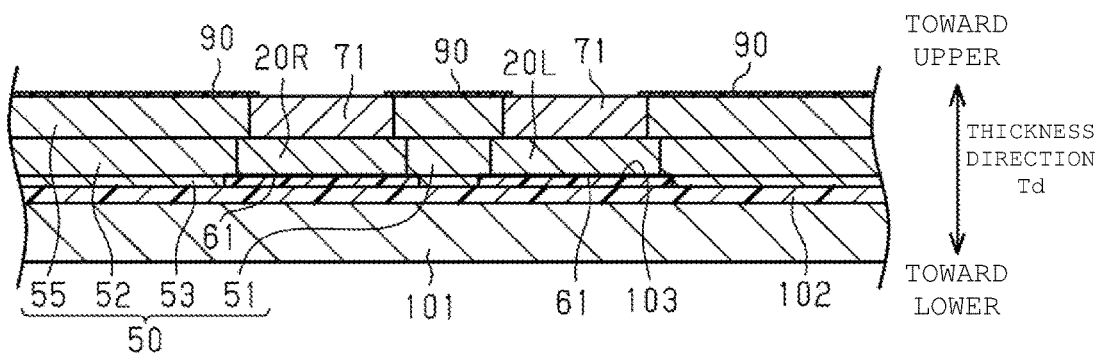
FIG. 15 is an explanatory diagram of a method of manufacturing the inductor component.

Next, as illustrated in FIG. 15, an insulation layer processing step is performed. Specifically, a solder resist functioning as the insulation layer 90 is patterned by photolithography in a portion, of the upper face of the second magnetic layer 55 and the upper face of each of the vertical wires 71 and 72, where the terminal portion 80 is not formed. In the present embodiment, the direction orthogonal to the upper face of the insulation layer 90, that is, the main face MF of the element body BD, is the thickness direction Td.

Figure 16:
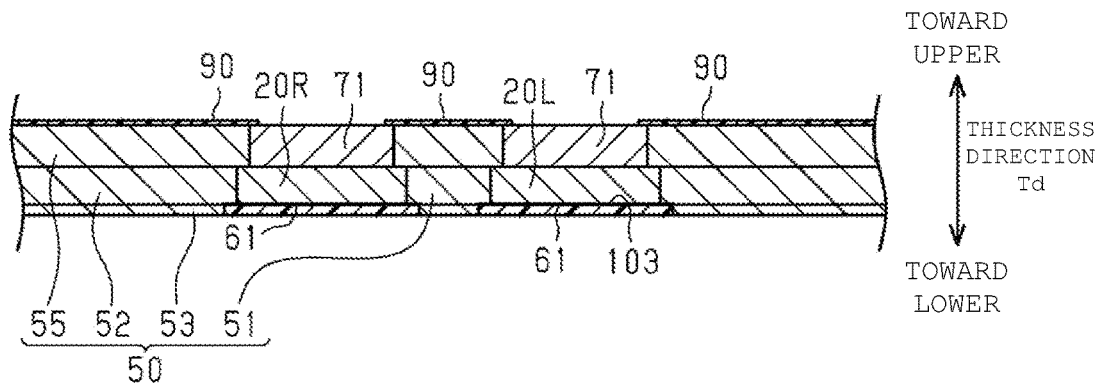
FIG. 16 is an explanatory diagram of a method of manufacturing the inductor component.

Next, as illustrated in FIG. 16, a base member cutting step is performed. Specifically, the base member 101 and the dummy insulation layer 102 are all removed by cutting. As a result of cutting the whole dummy insulation layer 102, part of the lower portions of the respective insulation resins are removed by cutting, but the inductor wires 20R and 20L are not removed.

Figure 17:
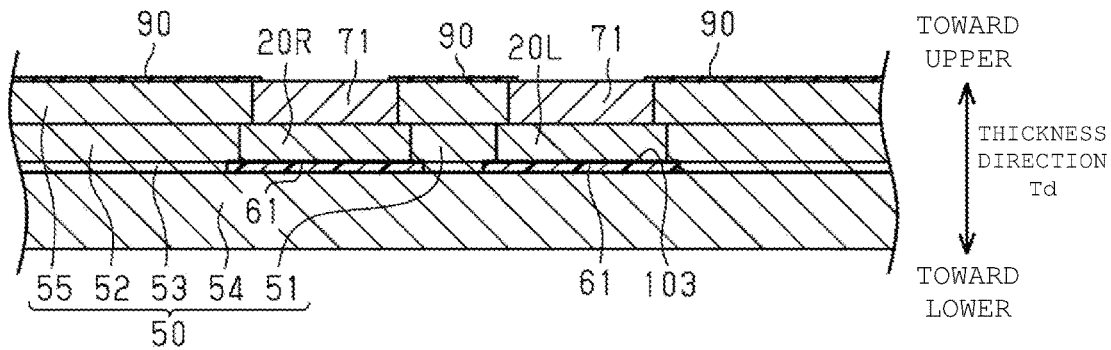
FIG. 17 is an explanatory diagram of a method of manufacturing the inductor component.

Next, as illustrated in FIG. 17, a first magnetic layer processing step of laminating the first magnetic layer 54 is performed. Specifically, first, a resin containing the magnetic powder, which is the material of the first magnetic layer 54, is applied to the lower face of the base member 101. Next, the resin containing the magnetic powder is hardened by press working to form the first magnetic layer 54 on the lower face of the base member 101.

Next, the lower end of the first magnetic layer 54 is scraped. For example, the lower end of the first magnetic layer 54 is scraped so that the dimension from the upper face of each of the external terminals 81 and 82 to the lower face of the first magnetic layer 54 is a desired value.

Figure 18:
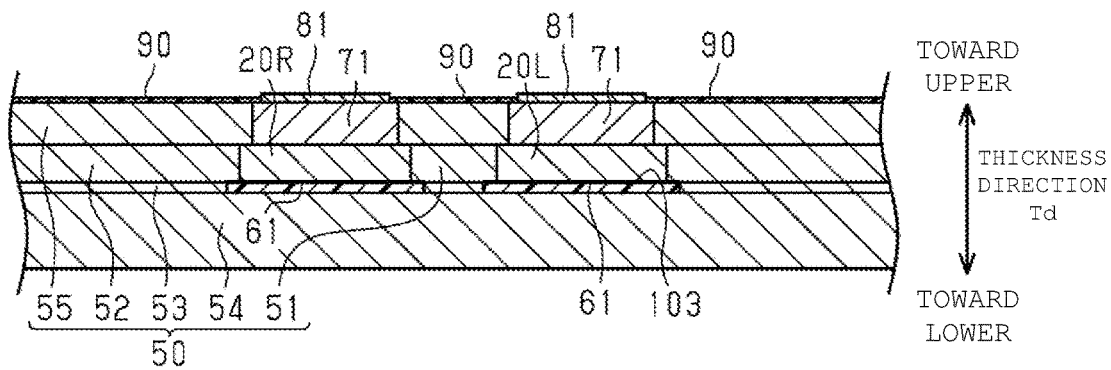
FIG. 18 is an explanatory diagram of a method of manufacturing the inductor component.

Next, as illustrated in FIG. 18, a terminal portion processing step is performed. Specifically, the first external terminal 81, the second external terminal 82, and the dummy portion 83 are formed on a portion, the upper face of the second magnetic layer 55 and the upper face of each of the vertical wires 71 and 72, which is not covered with the insulation layer 90. In this step, first, the first metal layer 111 is formed by electroless plating of copper for each of the first external terminal 81, the second external terminal 82, and the dummy portion 83. Next, the second metal layer 112 is formed by electroless plating of nickel. Thereafter, the third metal layer 113 is formed by electroless plating of gold. A catalyst layer such as palladium may be provided between the first metal layer 111 and the second metal layer 112. As a result, the first external terminal 81, the second external terminal 82, and the dummy portion 83 having a three-layer structure are formed.

The upper face of each of the vertical wires 71 and 72 is located below the upper face of the second magnetic layer 55 in the thickness direction Td. Therefore, the recess 120 recessed downward in the thickness direction Td is formed in the external terminals 81 and 82 on the vertical wires 71 and 72, respectively. In addition, the smooth portions 121 and the rough portions 122 are formed in the first external terminal 81 and the second external terminal 82 by reflecting the surface roughness of the vertical wires 71 and 72 or the second magnetic layer 55 located below them.

In FIG. 18, the first external terminal 81 is illustrated, and the second external terminal 82 and the dummy portion 83 are not illustrated. Further, in FIG. 18, the recess 120, the smooth portion 121, and the rough portion 122 are not illustrated.

Figure 19:
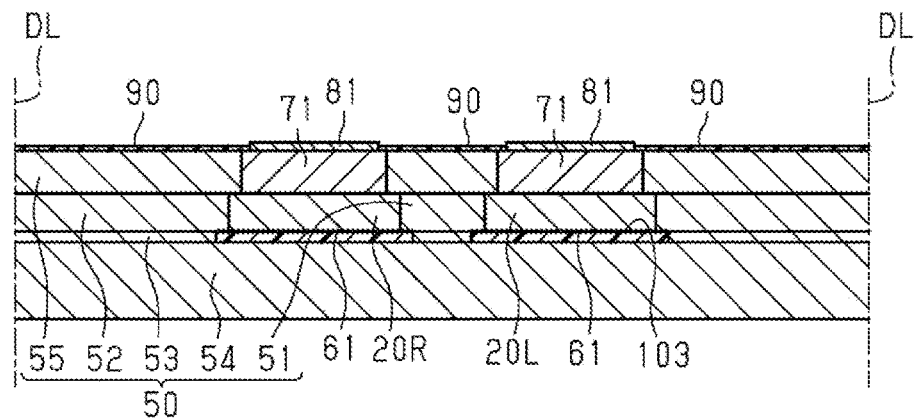
FIG. 19 is an explanatory diagram of a method of manufacturing the inductor component.

Next, as illustrated in FIG. 19, a segmenting step is performed. Specifically, segmentation is performed by cutting with a dicing machine at the break line DL. As a result, the inductor component 10 can be obtained.

Figure 20:
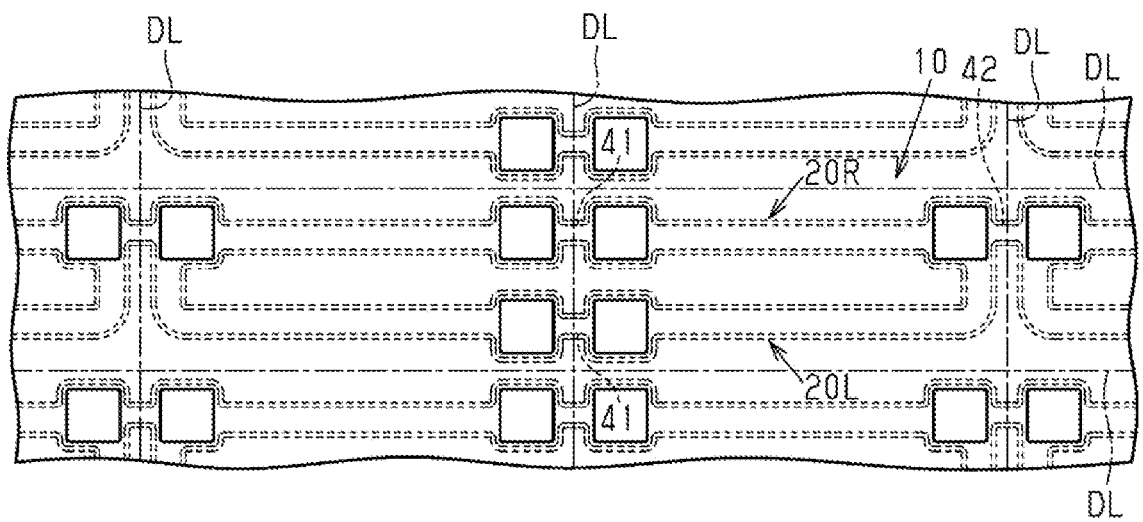
FIG. 20 is an explanatory diagram of a method of manufacturing the inductor component.

In a state before cutting with a dicing machine, for example, as illustrated in FIG. 20, a plurality of inductor components is disposed in parallel in the longitudinal direction Ld and the short direction Wd, and the individual inductor components are connected by the element body BD, the first support wire 41, and the second support wire 42. Specifically, the first support wires 41 are connected to each other, and the second support wires 42 are connected to each other. By cutting the first support wire 41 and the second support wire 42 including the break line DL in the thickness direction Td, the cut face of the first support wire 41 is exposed from the first side face 93 as the exposed face 41A. Further, the cut face of the second support wire 42 is exposed from the second side face 94 as the exposed face 42A.

After the segmenting step, each inductor component 10 is allowed to stand for a certain period in the presence of oxygen. As a result, a portion including the exposed face 41A of the first support wire 41 and a portion including the exposed face 42A of the second support wire 42 are oxidized to form a Cu oxide.

Next, the operation of the present embodiment will be described.

When the first external terminal 81 and the second external terminal 82 are irradiated with light from a low angle, a difference in optical color due to a difference in surface roughness occurs between the smooth portion 121 and the rough portion 122. When light is applied from a low angle, a surface having a relatively small surface roughness appears to have lower luminance, and a surface having a relatively large surface roughness appears to have higher luminance. Therefore, in the first external terminal 81 and the second external terminal 82, the color of the rough portion 122 looks brighter than that of the smooth portion 121. A difference in color on the above-described first external terminal 81 and the second external terminal 82 is caused by the above-described difference in surface roughness.

On the other hand, the surface roughness of the dummy portion 83 is substantially the same as the surface roughness of the rough portion 122. Therefore, when light is applied to the dummy portion 83 from a low angle as described above, the dummy portion 83 appears in the same color as a whole. The color of the dummy portion 83 is substantially the same as that of the rough portion 122 of the first external terminal 81 and the second external terminal 82.

Next, effects of the present embodiment will be described.

(1) In the above embodiment, the shape of the dummy portion 83 is different from those of the first external terminal 81 and the second external terminal 82 when viewed from the thickness direction Td. That is, the shape of the specific dummy portion 83S is different from the shape of the specific terminal portion 80S. In the present embodiment, since the number of dummy portions 83 provided in the inductor component 10 is one, the dummy portions 83 are provided asymmetrically with respect to the geometric center G of the main face MF. Therefore, the orientation of the inductor component 10 can be easily identified by the dummy portion 83. When the orientation of the inductor component 10 can be determined, for example, it is easy to correctly install the inductor component 10 when mounting the inductor component 10 on a substrate.

The terminal portions 80 are disposed at the two-fold symmetrical positions with respect to the geometric center G of the main face MF. As compared with a case where the terminal portions 80 are disposed at the asymmetric position, the weight of the inductor component 10 is well balanced, and inclination hardly occurs at the time of mounting.

(2) In the above embodiment, when viewed from the thickness direction Td, the area of the dummy portion 83 is equal to that of each of the first external terminal 81 and the second external terminal 82. Therefore, when the dummy portion 83 is soldered to the substrate or the like in the same manner as the first external terminal 81 and the second external terminal 82, the amount of solder applied onto these four terminal portions 80 can be made uniform. Therefore, it is possible to prevent the inductor component 10 from being tilted and mounted on a substrate or the like.

(3) In the above embodiment, the dummy portion 83 is not provided in the first region of the main face MF. In addition, the number of dummy portions 83 provided in the above embodiment is one. That is, the inductor component 10 is provided with the minimum number of dummy portions 83. By minimizing the number of dummy portions 83, it is possible to suppress an increase in weight of the inductor component 10.

(4) In the above embodiment, when viewed from the thickness direction Td, most of the dummy portion 83 overlaps the second inductor wire 20L. The second inductor wire 20L is made of a material different from that of the magnetic layer 50 disposed around the second inductor wire 20L. Therefore, the second inductor wire 20L and the magnetic layer 50 have different linear expansion coefficients. Therefore, when a change in temperature occurs in the inductor component 10, warpage or the like may occur in the inductor component 10 due to a difference in deformation amount between the second inductor wire 20L and the magnetic layer 50. Since the dummy portion 83 is disposed so as to overlap the second inductor wire 20L, the dummy portion 83 can function as a reinforcing portion that suppresses warpage or the like of the inductor component 10.

(5) In the above embodiment, each of the terminal portions 80 includes the first metal layer 111, the second metal layer 112, and the third metal layer 113. That is, the dummy portion 83 can be formed in the same step as the first external terminal 81 and the second external terminal 82. Therefore, when the dummy portion 83 is newly provided, it is possible to suppress an increase in the number of manufacturing processes of the inductor component 10.

(6) In the above embodiment, when viewed from the thickness direction Td, the whole dummy portion 83 and half or more of the regions of the first external terminal 81 and the second external terminal 82 have optically the same color. When the first external terminal 81 and the second external terminal 82 are inspected, the color of their surfaces may be determined to ensure quality. Therefore, when the dummy portion 83 has the same color as the first external terminal 81 and the second external terminal 82, the inspection by the determination of the same color can also be applied to the dummy portion 83.

(7) In the above embodiment, the first external terminal 81 and the second external terminal 82 include the rough portion 122. When the inductor component 10 is mounted, the terminal portion 80 and the substrate may be mounted by solder. Since the surface area of the rough portion 122 is larger than that of the smooth portion 121, the contact area with the solder increases. This makes it easy to maintain the connection strength with solder.

(8) In the above embodiment, the first external terminal 81 and the second external terminal 82 include the smooth portion 121. The smooth portion 121 is disposed on each of the vertical wires 71 and 72 when viewed from the thickness direction Td. As described above, when the inductor component 10 is mounted, the terminal portion 80 and the substrate may be mounted by solder. Since the surface roughness of the smooth portion 121 is smaller than that of the rough portion 122, the wettability of the solder is improved. Therefore, at the time of soldering, the solder easily spreads to the smooth portion 121, and conductivity by the solder can be reliably ensured.

(9) In the above embodiment, the recess 120 is provided in the first external terminal 81 and the second external terminal 82. When the inductor component 10 is mounted on a substrate or the like, a spherical solder ball may be attached to the inductor component, and then the solder may be melted to perform mounting. At this time, the presence of the recess 120 makes it easy to place the solder ball. The recess 120 is formed on each of the vertical wires 71 and 72 when viewed from the thickness direction Td. Therefore, in the case of forming the solder ball to perform mounting as described above, when the solder balls are melted, the solder easily spreads to the recess 120, and when viewed from the thickness direction Td, the solder easily spreads over the vertical wires 71 and 72.

(10) In the above embodiment, the dummy portion 83 is disposed on the upper face of the second magnetic layer 55, and the outer edge of the dummy portion 83 is in contact with the insulation layer 90. As described above, after the insulation layer 90 is patterned on the upper face of the second magnetic layer 55, the terminal portion 80 is formed by electroless plating at a non-pattern portion. Therefore, the dummy portion 83 can be easily formed in a shape different from the external terminals 81 and 82 by the patterning shape of the insulation layer 90.

(11) In the above embodiment, the second pad 23R in the first inductor wire 20R is identical to the second pad 23R in the second inductor wire 20L. The volume of the magnetic layer 50 in the inductor component 10 of the above embodiment is larger by one pad and one vertical wire than an inductor component in which each inductor wire has two different pads. Since the volume of the magnetic layer 50 is large, the inductance acquisition efficiency tends to be large.

(12) In the above embodiment, the first wiring body 21R extends linearly. The second wiring body 21L includes the long straight portion 31 extending in the longitudinal direction Ld, the short straight portion 32 extending in the short direction Wd, and the connection portion 33 connecting these portions, and extends in an L shape. That is, the number of connection portions is small in both the first inductor wire 20R and the second inductor wire 20L, and the number of turns of the wiring is small. Since the number of turns of the inductor wires 20R and 20L is small and routing of the wires is small, direct current resistance in each of the inductor wires 20R and 20L is reduced, and inductance acquisition efficiency is easily secured.

(13) In the above embodiment, the average value of the pitch X1, the first distance Y1, and the second distance Y2 is "200 micrometers". The ratio of the pitch X1 to the average value is "125%". The ratio of the first distance Y1 and the second distance Y2 to the average value is "87.5%".

When there is a deviation in the above ratios, the arrangement of the inductor wires 20R and 20L in the element body BD is deviated. When there is a deviation in the arrangement of the inductor wire in the element body BD, the weight balance of the element body BD is deviated, and the inductor component may be tilted and mounted on the substrate. Therefore, it is preferable that the inductor wires be disposed in the element body BD without large deviation. Specifically, the above ratios are preferably 50% or more and 150% or less (i.e., from 50% to 150%), and in the present embodiment, the value of each ratio falls within the above range, which is a preferable state.

(14) In the above embodiment, the pitch X1 is longer than the first distance Y1 and the second distance Y2. When the pitch X1 is longer than the first distance Y1 and the second distance Y2, the length of the short straight portion 32 of the second wiring body 21L tends to be longer, and the wiring length of the second inductor wire 20L is easily designed to be long.

(15) In the above embodiment, the distance between the adjacent parallel portions of the wiring bodies is 200 micrometers. From the viewpoint of suppressing the disturbance of the magnetic flux between the inductor wires, the minimum interval is preferably 50 micrometers or more, and more preferably about 100 micrometers or more.

(16) In the above embodiment, the dimension of the element body BD in the thickness direction Td is about 0.2 mm. The smaller the dimension of the element body BD in the thickness direction Td, the smaller the dimension protruding from the substrate when the inductor component 10 is mounted on the substrate. Therefore, the inductor component 10 according to the above embodiment can also be mounted on a portion where it cannot be mounted when the dimension in the thickness direction Td is large.

(17) In the above embodiment, the first inductor wire 20R, the second inductor wire 20L, the first support wire 41, and the second support wire 42 are present in the first layer L1. In a state in which the plurality of inductor components 10 is disposed side by side, that is, in a state before cutting with a dicing machine, a configuration in which the plurality of inductor wires is connected by the first support wire 41 and the second support wire 42 can be employed. When the plurality of first inductor wires 20R and the plurality of second inductor wires 20L are connected by the first support wire 41 and the second support wire 42, these inductor wires can be supported and positioned without requiring an insulation substrate or the like for supporting the inductor wire. Therefore, it is possible to contribute to thinning of the inductor component 10 in that an insulation substrate or the like for supporting the inductor wire is unnecessary.

(18) In the above embodiment, the first support wire 41 and the second support wire 42 are in close contact with the magnetic layer 50. Since the magnetic layer 50 is in close contact with the first support wire 41 and the second support wire 42, the volume of the magnetic layer 50 can be secured, and the acquisition efficiency of the inductance of the inductor component 10 is easily secured.

(19) In the above embodiment, the exposed face 41A of the first support wire 41 is made of a Cu oxide in the present embodiment. Since the exposed face 41A is made of a Cu oxide, the conductivity is reduced at the exposed face 41A. Therefore, when another electric component and the exposed face 41A come into contact with each other, it is possible to prevent a current from flowing with the exposed face 41A interposed therebetween. The same applies to the second support wire 42.

The present embodiment can be modified as follows. The present embodiment and the following modification examples can be implemented in combination with each other within a range not technically contradictory.

Three or more inductor wires may be provided inside the element body BD.

Figure 22:
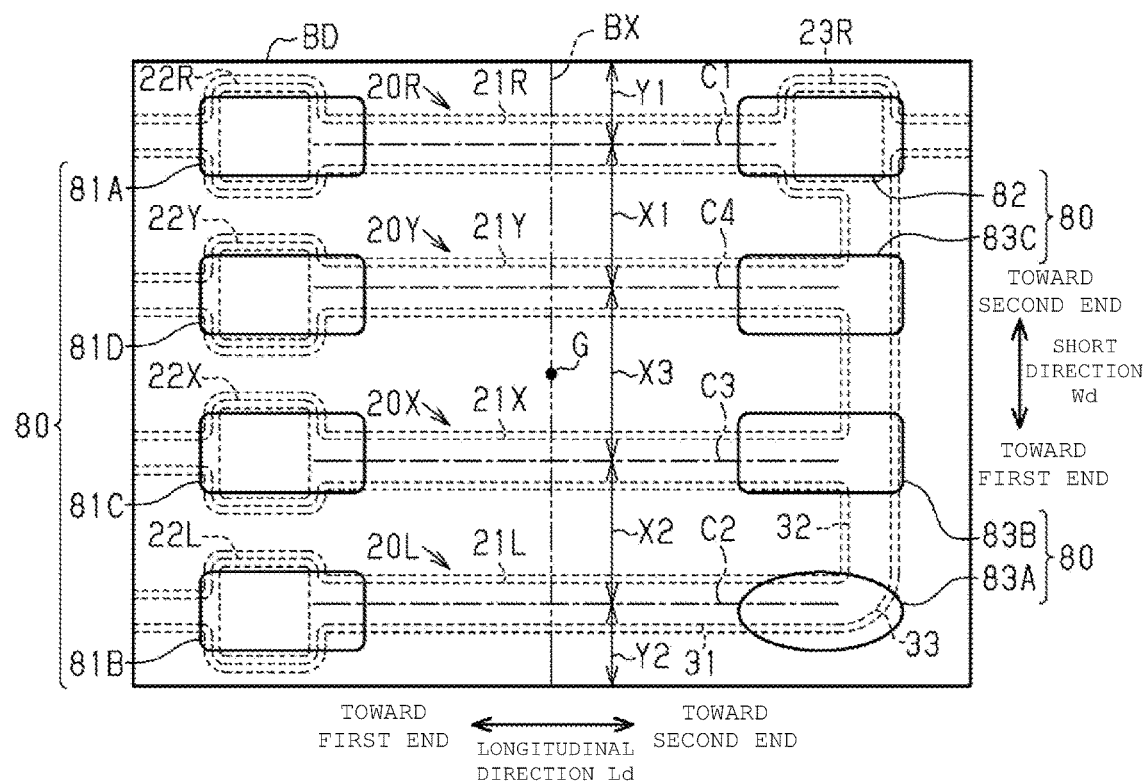
FIG. 22 is a transparent top view of an inductor component according to a modification example.

In the example illustrated in FIG. 22, in addition to the first inductor wire 20R and the second inductor wire 20L, a third inductor wire 20X and a fourth inductor wire 20Y extend into the element body BD. A third wiring body 21X of the third inductor wire 20X extends in parallel with the first wiring body 21R of the first inductor wire 20R. The third wiring body 21X is disposed between the first wiring body 21R and the long straight portion 31 of the second wiring body 21L. The first end of the third wiring body 21X is connected to the short straight portion 32 of the second wiring body 21L. That is, part of the wiring of the third inductor wire 20X is shared with the second inductor wire 20L. A first pad 22X is connected to the second end of the third wiring body 21X.

A fourth wiring body 21Y of the fourth inductor wire 20Y extends in parallel with the first wiring body 21R of the first inductor wire 20R. The fourth wiring body 21Y is disposed between the first wiring body 21R and the third wiring body 21X. The first end of the fourth wiring body 21Y is connected to the short straight portion 32 of the second wiring body 21L. That is, part of the wiring of the fourth inductor wire 20Y is shared with the second inductor wire 20L. A first pad 22Y is connected to the second end of the fourth wiring body 21Y.

The first wiring body 21R of the first inductor wire 20R extends in parallel with one side of the outer edge of the element body BD. The second pad 23R of the first inductor wire 20R and the second pad 23R of the second inductor wire 20L are the identical pad. The first pad 22L and the second pad 23R of the second inductor wire 20L are disposed at symmetrical positions with respect to the geometric center G. That is, the first inductor wire 20R and the second inductor wire 20L are disposed along three sides of the quadrangular shape of the element body BD and extend in a wide range of the element body BD. Therefore, it is easy to secure a large acquisition range of the inductance of the inductor component.

In the example illustrated in FIG. 22, the third wiring body 21X of the third inductor wire 20X and the fourth wiring body 21Y of the fourth inductor wire 20Y are parallel portions extending in parallel with the first wiring body 21R. A distance from the central axis line C1 of the first wiring body 21R to the central axis line C4 of the fourth wiring body 21Y at the parallel portion and in a direction orthogonal to the direction in which the parallel portion extends is defined as a pitch X1. A distance from the central axis line C2 of the second wiring body 21L to the central axis line C3 of the third wiring body 21X at the parallel portion and in a direction orthogonal to the direction in which the parallel portion extends is defined as a pitch X2. In addition, a distance from the central axis line C3 of the third wiring body 21X to the central axis line C4 of the fourth wiring body 21Y in a direction orthogonal to the direction in which the parallel portion extends is defined as a pitch X3. At this time, the pitch X1 and the pitch X2 are equal, and the pitch X3 is larger than the pitches X1 and X2.

As in this modification example, the wiring bodies may be disposed at different pitches. That is, the wiring bodies may not be disposed at equal intervals. When the pitch between the wiring bodies of the inductor wire is different, it is easy to set the magnitude of the inductance value acquired from each inductor wire, and it is easy to make design so that an inductance value suitable for the use conditions of the inductor component 10 can be obtained.

In a case where there are three or more inductor wires and these have parallel portions extending in parallel with each other, when there is a large difference in respective pitches, the inductor wires are unevenly disposed in the element body. Therefore, the arrangement of the external terminals is deviated, or the weight balance of the inductor component is biased. Therefore, the ratio of each pitch to the average value of the pitches is preferably 85% or more and 115% or less (i.e., from 85% to 115%).

In the example illustrated in FIG. 22, the pitch X1 can be "250 micrometers", the pitch X2 can be "250 micrometers", and the pitch X3 can be "310 micrometers". The average value of the pitches is thus approximately "270 micrometers". The ratio of each pitch to the average value of the pitches is approximately "93%" for the pitch X1, approximately "93%" for the pitch X2, and approximately "115%" for the pitch X3. Therefore, in the example illustrated in FIG. 21, the ratio of each pitch to the average value of the pitches is 85% or more and 115% or less for all the pitches (i.e., from 85% to 115%).

Also, in the above embodiment and the example illustrated in FIG. 22, the ratio of each pitch to the average value of the pitches may be less than 85% or may be more than 115%.

As in the example illustrated in FIG. 22, the plurality of dummy portions 83 may be provided, or the dummy portions 83 may have different shapes. In the example illustrated in FIG. 22, the eight terminal portions 80 are provided when viewed from the thickness direction Td. When viewed from the thickness direction Td, a first external terminal 81A is provided on the first pad 22R of the first inductor wire 20R. A first external terminal 81B is provided on the first pad 22L of the second inductor wire 20L. A first external terminal 81C is provided on the first pad 22X of the third inductor wire 20X. A first external terminal 81D is provided on the first pad 22Y of the fourth inductor wire 20Y. The second external terminal 82 is provided on the second pad 23R of the first inductor wire 20R. When viewed from the thickness direction Td, the external terminal has a rectangular shape and has a long side extending in parallel with the longitudinal direction Ld.

In addition, a dummy portion 83A is provided on the connection portion 33 of the second wiring body 21L. A dummy portion 83B is provided at a portion where the third wiring body 21X and the short straight portion 32 of the second wiring body 21L are connected. A dummy portion 83C is provided at a portion where the fourth wiring body 21Y and the short straight portion 32 of the second wiring body 21L are connected. That is, the number of dummy portions is smaller than that of the external terminals.

The eight terminal portions 80 are disposed at the two-fold symmetrical positions with respect to the geometric center G of the main face MF when viewed from the thickness direction Td.

It is assumed that an imaginary straight line BX passing through the geometric center G from the center of the element body BD in the longitudinal direction Ld and parallel to the short direction Wd is drawn. When a region toward the first end in the longitudinal direction Ld relative to the imaginary straight line BX is defined as a first region, the dummy portion is not provided in the first region. When a region toward the second end in the longitudinal direction Ld relative to the imaginary straight line BX is defined as a second region, three dummy portions are provided in the second region, and the number of dummy portions is equal to or larger than the number of external terminal portions.

Among the dummy portions, the dummy portion 83A formed on the connection portion 33 has a shape different from other dummy portions. Specifically, when viewed from the thickness direction Td, the dummy portion 83A has an elliptical shape and the other dummy portions 83B and 83C have the same rectangular shape as the external terminal. The shape of the dummy portion 83A is not limited to the elliptical shape, but may be, for example, a rectangular shape or a circular shape different from the external terminal.

As illustrated in FIG. 22, in a case where a plurality of dummy portions is provided, when the shape of at least one of the plurality of dummy portions is different from that of the external terminal, the direction of the inductor component can be identified. In the example illustrated in FIG. 22, the number of dummy portions is larger than the number of external terminals in the second region. When the inductor component is soldered to the substrate, since the terminal portion 80 is soldered, the fixing force of the inductor component is improved as the number of the terminal portions 80 increases. However, when the number of the terminal portions 80 is reflected and the inductor component is provided with the vertical wires whose number is the same as the number of the terminal portions 80, the volume of the magnetic layer 50 decreases and the inductance acquisition efficiency deteriorates. Therefore, in the inductor component of the example illustrated in FIG. 22, by increasing the number of dummy portions, the volume of the magnetic layer 50 is not reduced, and the fixing of the inductor component is easily maintained.

Figure 23:
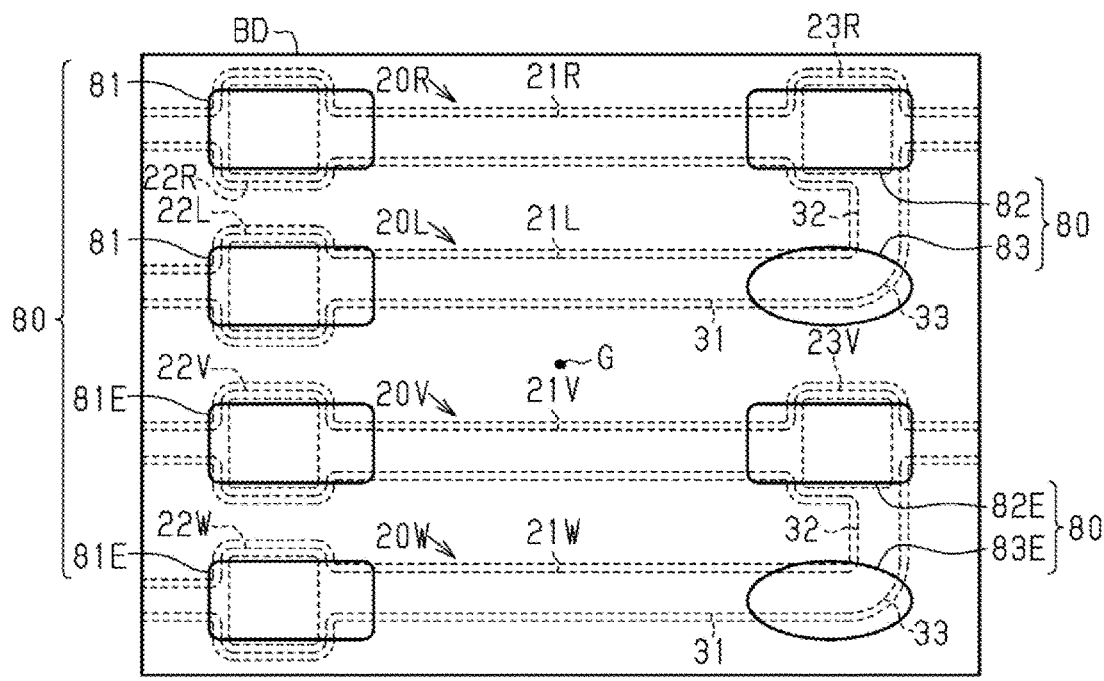
FIG. 23 is a transparent top view of an inductor component according to a modification example.

In the example illustrated in FIG. 23, in addition to the first inductor wire 20R and the second inductor wire 20L, a third inductor wire 20V and a fourth inductor wire 20W extend into the element body BD. The third inductor wire 20V has the same shape as the first inductor wire 20R. The fourth inductor wire 20W has the same shape as the second inductor wire 20L. That is, the third wiring body 21V extends linearly, and a fourth wiring body 21W includes the long straight portion 31, the short straight portion 32, and the connection portion 33 and extends in a substantially L shape.

The first end of the third wiring body 21V is connected to a first pad 22V, and the second end is connected to a second pad 23V. The first end of the fourth wiring body 21W is connected to a first pad 22W, and the second end is connected to the second pad 23V. When viewed from the thickness direction Td, a third external terminal 81E is provided on the first pad 22V. The third external terminal 81E is provided on the first pad 22W. A fourth external terminal 82E is provided on the second pad 23V. A dummy portion 83E is provided on the connection portion 33 of the fourth wiring body 21W. When viewed from the thickness direction Td, the shapes of the third external terminal 81E and the fourth external terminal 82E are rectangular and are the same as those of the first external terminal 81 and the second external terminal 82. The shape of the dummy portion 83E is elliptical and is the same as that of the dummy portion 83. In the example illustrated in FIG. 23, the four first external terminals, the two second external terminals, and the two dummy portions 83 are provided, and the eight terminal portions 80 are provided.

In the example illustrated in FIG. 23, the eight terminal portions are provided two-fold symmetrically with respect to the geometric center G of the element body BD.

As in the example illustrated in FIG. 23, a plurality of pads in which a plurality of inductor wires is connected may be provided in the element body BD.

As in the example illustrated in FIG. 23, the plurality of dummy portions 83 may be provided, and the shape of the dummy portion 83 when viewed from the thickness direction Td may match in all the dummy portions 83.

Figure 24:
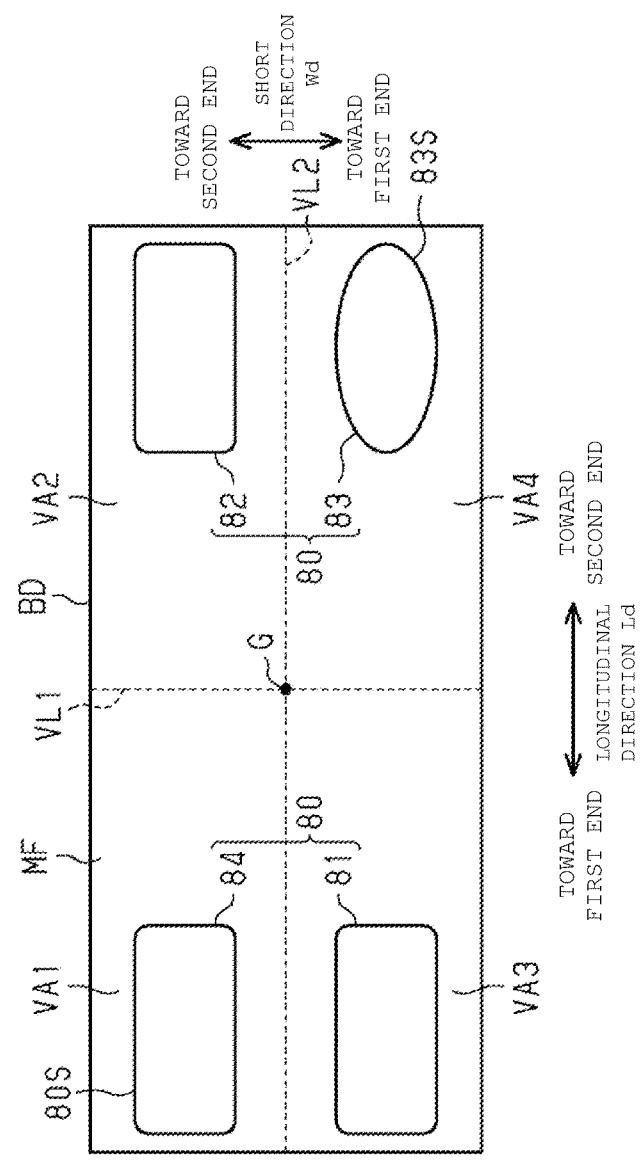
FIG. 24 is a top view of an inductor component according to a modification example.

As illustrated in FIG. 24, the dummy portion 83 may be disposed at the two-fold symmetrical position with respect to the geometric center G of the main face MF. In the example illustrated in FIG. 24, the four terminal portions 80 are provided when viewed from the thickness direction Td. The four terminal portions 80 are disposed at four corners of the main face MF and are disposed at the two-fold symmetrical positions with respect to the geometric center G of the main face MF. Among the four terminal portions 80, the first external terminal 81 is disposed at a corner toward the first end in the longitudinal direction Ld and toward the first end in the short direction Wd. The second external terminal 82 is disposed at a corner toward the second end in the longitudinal direction Ld and toward the second end in the short direction Wd. Although not illustrated, each of the first external terminal 81 and the second external terminal 82 is connected to the end of the inductor wire extending inside the element body BD with the vertical wire interposed therebetween. The first external terminal 81 and the second external terminal 82 are rectangular and have the same shape when viewed from the thickness direction Td.

Among the four terminal portions 80, the first dummy portion 83 is provided at a corner toward the second end in the longitudinal direction Ld and toward the first end in the short direction Wd. The first dummy portion 83 has an elliptical shape when viewed from the thickness direction Td. A second dummy portion 84 is provided at a corner toward the first end in the longitudinal direction Ld and toward the second end in the short direction Wd. The second dummy portion 84 has the same rectangular shape as the first external terminal 81 and the second external terminal 82 when viewed from the thickness direction Td.

The first dummy portion 83 and the second dummy portion 84 are disposed at the two-fold symmetrical positions with respect to the geometric center G of the main face MF. The shape of the first dummy portion 83 is different from those of the first external terminal 81, the second external terminal 82, and the second dummy portion 84.

In the example illustrated in FIG. 24, it is assumed that the main face MF is divided into four imaginary regions by a first imaginary straight line VL1 passing through the center of the main face MF in the longitudinal direction Ld and parallel to the short direction Wd and a second imaginary straight line VL2 passing through the center of the main face MF in the short direction Wd and parallel to the longitudinal direction Ld. One terminal portion 80 is provided in each of the four imaginary regions.

Specifically, an imaginary region toward the first end in the longitudinal direction Ld relative to the first imaginary straight line VL1 and toward the second end in the short direction Wd relative to the second imaginary straight line VL2 is defined as the first imaginary region VA1. The second dummy portion 84 is provided in the first imaginary region VA1. An imaginary region toward the second end in the longitudinal direction relative to the first imaginary straight line VL1 and toward the second end in the short direction Wd relative to the second imaginary straight line VL2 is defined as the second imaginary region VA2. The first external terminal 81 is provided in the third imaginary region VA3. An imaginary region toward the first end in the longitudinal direction Ld relative to the first imaginary straight line VL1 and toward the first end in the short direction Wd relative to the second imaginary straight line VL2 is defined as the third imaginary region VA3. The first external terminal 81 is provided in the third imaginary region VA3. An imaginary region toward the second end in the longitudinal direction Ld relative to the first imaginary straight line VL1 and toward the first end in the short direction Wd relative to the second imaginary straight line VL2 is defined as the fourth imaginary region VA4. The first dummy portion 83 is provided in the fourth imaginary region VA4. That is, in the example illustrated in FIG. 24, the specific dummy portion 83S is the first dummy portion 83, and the specific terminal portion 80S is the second dummy portion 84.

As in the example illustrated in FIG. 24, when the first dummy portion 83 and the second dummy portion 84 are disposed symmetrically, when the shape of the first dummy portion 83 is different from the shapes of the other terminal portions 80, it is easy to identify the orientation of the inductor component.

In the example illustrated in FIG. 24, the shape of the specific dummy portion 83S may be any shape as long as it is different from the shape of the specific terminal portion 80S. When the shape of the specific dummy portion 83S and the shape of the specific terminal portion 80S are both quadrangular shapes, the shape of the specific dummy portion 83S is different from the shape of the specific terminal portion 80S as long as one is a square and the other is a rectangle. In addition, when the shape of the specific dummy portion 83S and the shape of the specific terminal portion 80S are similar to each other, the shape of the specific dummy portion 83S is different from the shape of the specific terminal portion 80S as long as the dimensions thereof are different to an extent that they can be distinguished from each other in appearance.

In the above embodiment, the connection portion 33 may not be provided in the second inductor wire 20L. The connection portion 33 may have a shape in which the long straight portion 31 and the short straight portion 32 are connected at a right angle and in a bent manner.

The two pads of the second inductor wire 20L may not be disposed at symmetrical positions with respect to the geometric center G of the element body BD. When the first inductor wire 20R and the second inductor wire 20L are disposed in a row and the pads are also disposed in a row, the inductor component is long in one direction. The position of each pad in the example of the above embodiment may be changed so that the inductor component has a shape suitable for mounting.

In the above embodiment, the central axis line A1 of the first support wire 41 and the central axis line A2 of the second support wire 42 may not coincide with each other. The arrangement of the support wires can be appropriately changed according to the shapes and the like of the first pads 22R and 22L and the second pad 23R.

In the above embodiment, the first wiring body 21R and the second wiring body 21L may have different sectional areas, and the first wiring body 21R and the second wiring body 21L may have different dimensions in the wiring width and the thickness direction Td. As long as the first wiring body 21R and the second wiring body 21L have different sectional areas, the inductance values may be different when the wiring lengths thereof are the same.

In the above embodiment, the inductance values of the first wiring body 21R and the second wiring body 21L are not limited to those of the example of the above embodiment. For example, the first wiring body 21R and the second wiring body 21L may have the same wiring length, and the first inductor wire 20R and the second inductor wire 20L may have the same inductance ratio.

In the above embodiment, the position of the first support wire 41 is not limited to the example of the above embodiment. For example, the position of the central axis line A1 of the first support wire 41 in the short direction Wd may be the same as the position of the central axis line of the connected wiring body in the short direction Wd. When the wiring body has a connected portion, the central axis line A1 of the first support wire 41 may be shifted from the central axis line of the linear portion as long as the end of the wiring body toward the pad is linear.

In the above embodiment, the number of support wires exposed from the first side face 91 and the second side face 92 may be three or more according to the number of inductor wires, or all may be omitted.

In the above embodiment, the average grain diameter of the metal magnetic powder contained in the magnetic layer 50 is not limited to the example of the above embodiment.

However, in order to ensure the relative permeability, the average grain diameter of the metal magnetic powder is preferably one micrometer or more and 10 micrometers or less (i.e., from one micrometer to 10 micrometers).

In the above embodiment, the metal magnetic powder contained in the first magnetic layer 54 and the second magnetic layer 55 may not be the metal magnetic powder containing Fe. The metal magnetic powder may be a metal magnetic powder containing FeNi or FeSiCr.

In the above embodiment, the interval between the parallel portions is preferably 50 μm or more from the viewpoint of suppressing the disturbance of the magnetic flux generated between the wires. When it is less than 50 micrometers, it is preferable to dispose an insulation resin or an insulating inorganic substance between the inductor wires from the above viewpoint.

In the above embodiment, the pitch X1, the first distance Y1, and the second distance Y2 may be equal, or the first distance Y1 and the second distance Y2 may be larger than the pitch X1. The first distance Y1 and the second distance Y2 may be different from each other.

Also, in the above embodiment, the respective ratios of each pitch, the first distance Y1, and the second distance to the average value of each pitch, the first distance Y1, and the second distance Y2 may be less than 50% or more than 150%.

The shapes of the wiring bodies 21R and 21L in the first inductor wire 20R and the second inductor wire 20L are not limited to the example of the above embodiment as long as the number of turns is 0.5 turns or less. For example, the wiring bodies 21R and 21L may have a wave shape or a meander shape. When the wiring bodies 21R and 21L have a meander shape, the pitch between the portions extending linearly from the first pads 22R and 22L among the two different wiring bodies 21R and 21L is a pitch of the first inductor wire 20R and the second inductor wire 20L.

In the above embodiment, the dimension of the element body BD in the thickness direction Td is not limited to the example of the above embodiment. However, as described above, the smaller the dimension of the element body BD in the thickness direction Td, the smaller the dimension protruding from the substrate when the inductor component 10 is mounted on the substrate, which is preferable. Specifically, the dimension is preferably 0.25 mm or less.

In the above embodiment, the dimension of the first layer L1, that is, the first inductor wire 20R and the second inductor wire 20L, in the thickness direction Td is not limited to the example of the above embodiment. However, as described above, the dimension is preferably one-tenth or more and one-third or less (i.e., from one-tenth to one-third) of the dimension of the element body BD in the thickness direction Td.

In the above embodiment, the pitch P1 from the central axis line A1 of the first support wire 41 extending from the first inductor wire 20R to the central axis line A1 of the first support wire 41 extending from the second inductor wire 20L is not limited to the example of the above embodiment. For example, the configuration may be such that the pitch P1, the distance Q1, and the distance Q2 are equal.

In the above embodiment, the composition of the first inductor wire 20R and the second inductor wire 20L is not limited to the example of the above embodiment. For example, silver or gold may be used.

In the above embodiment, the composition of the magnetic layer 50 is not limited to the example of the above embodiment. For example, the magnetic layer 50 may be made of ferrite powder or a mixture of a ferrite powder and a metal magnetic powder.

In the above embodiment, another layer may be interposed between each of the support wires 41 and 42 and the magnetic layer 50. For example, an insulation layer may be interposed between each of the support wires 41 and 42 and the magnetic layer 50.

In the above embodiment, the number of inductor wires extending in the element body BD may be one.

In the above embodiment, the areas of the first pads 22R and 22L and the second pad 23R may be equal to the areas of the first vertical wires 71 and the second vertical wires 72, respectively, when viewed from the thickness direction Td. In addition, the length dimensions of the first pads 22R and 22L and the second pad 23R in the direction orthogonal to the extension direction of the wiring bodies 21R and 21L may be the same as that of each of the wiring bodies 21R and 21L.

In the above embodiment, when viewed from the thickness direction Td, the terminal portions 80 may be disposed in the respective imaginary regions one by one, and the terminal portions 80 may not be disposed at the two-fold symmetrical positions with respect to the geometric center G. When the specific terminal portion 80S and the specific dummy portion 83S are not at the two-fold symmetrical positions, when the specific terminal portion 80S and the specific dummy portion 83S are disposed in an imaginary region which is located at the two-fold symmetrical positions, it can be said that the specific terminal portion 80S and the specific dummy portion 83S are disposed substantially symmetrically. Therefore, in this example, there may be a problem that it is difficult to identify the orientation of the inductor component 10. Therefore, by adopting the configuration related to the shape of the specific dummy portion 83S described above, the orientation of the inductor component 10 can be easily identified.

The manner of division when dividing the main face MF of the element body BD into the imaginary regions can be appropriately changed. For example, depending on the arrangement of the terminal portions 80, the main face MF may be divided into four imaginary regions by two diagonals, or may be equally divided such that four imaginary regions are disposed side by side in the longitudinal direction Ld. That is, it is sufficient to employ the manner of division in which the respective imaginary regions are congruent and the one terminal portion 80 is disposed in one imaginary region.

In the above embodiment, the metal layers of the external terminals 81 and 82 may be omitted, and the portions where the first vertical wires 71 and the second vertical wires 72 are exposed from the main face MF may function as the external terminals 81 and 82. In this case, a current can flow from the first vertical wire 71 and the second vertical wire 72 directly to the first inductor wire 20R and the second inductor wire 20L.

In the above embodiment, the outer faces of the first external terminal 81 and the second external terminal 82 may be covered with an insulation layer. In this case, in a state where the inductor component 10 before being mounted on a substrate or the like is stored, it is possible to prevent an unintended current from flowing inside the inductor component 10 through each external terminal. In the case of this modification example, before the inductor component 10 is mounted on a substrate or the like, cleaning or the like may be performed to remove the insulation layer covering the first external terminal 81 and the second external terminal 82.

In the above embodiment, the metal layer of the terminal portion 80 is not limited to the first metal layer 111, the second metal layer 112, and the third metal layer 113 of the above embodiment. In addition, a catalyst layer may be provided as necessary. For example, gold or tin can ensure solder wettability, nickel can suppress electromigration, and the metal layers of the external terminals 81 and 82 can be appropriately set according to each function. In addition, the dummy portion 83 and the first external terminal 81 and the second external terminal 82 may have different laminated structures.

Furthermore, the material of the dummy portion 83 may not be a material having conductivity. For example, a portion where the second magnetic layer 55 is exposed from the insulation layer 90 may be the dummy portion 83. As described above, when the dummy portion 83 is not made of a conductive material, there is no particular problem since the dummy portion 83 itself is not electrically connected to each inductor wire.

In the above embodiment, the area of the dummy portion 83 when viewed from the thickness direction Td may be different from the areas of the first external terminal 81 and the second external terminal 82.

In the above embodiment, the dummy portion may be provided in the first region. In the example of the above embodiment, in a case where the dummy portion is added to the first region, the terminal portions 80 may be disposed one by one in the respective imaginary regions by adding the dummy portion to the second region. In this case, the number of dummy portions may be larger than the number of external terminals in the second region of the imaginary straight line BX. The imaginary straight line BX may be drawn parallel to the longitudinal direction Ld.

In the above embodiment, when viewed from the thickness direction Td, the dummy portion 83 may not be on the inductor wire. As long as the terminal portions 80 are disposed one by one in the respective imaginary regions, the arrangement of the dummy portions 83 may be appropriately changed so as not to protrude out of the imaginary region.

In the above embodiment, in the dummy portion 83, the area having the same color as the external terminal may be less than half, or the color may be different from that of the external terminal in the whole region of the dummy portion 83.

In the above embodiment, the surface roughness of the first external terminal 81 and the second external terminal 82 may be substantially constant over the whole region.

In the above embodiment, the smooth portion 121 may not be provided on the vertical wires 71 and 72 of the first external terminal 81 and the second external terminal 82. That is, when viewed from the thickness direction Td, the smooth portion 121 may be shifted from the vertical wire. In a portion, of the first external terminal 81 and the second external terminal 82, which is not positioned on the vertical wire, the surfaces of the first external terminal 81 and the surface of the second external terminal 82 may be smoothed.

In the above embodiment, the recesses 120 may not be provided in the first external terminal 81 and the second external terminal 82. In addition, the recesses 120 provided in the first external terminal 81 and the second external terminal 82 may be provided at positions deviated from the vertical wires 71 and 72 when viewed from the thickness direction Td.

In the above embodiment, the material of a portion including the exposed face 41A of the first support wire 41 and a portion including the exposed face 42A of the second support wire 42 may not be a Cu oxide. When a Cu alloy is used as the first support wire 41 and the second support wire 42, it is preferable to employ a Cu alloy oxide as a material of a portion including each exposed face. Further, a resin insulation layer may be laminated on the exposed face 41A of the first support wire 41 and the exposed face 42A of the second support wire 42.

In the above embodiment, the material of the first support wire 41 and the second support wire 42 may be directly exposed from the respective exposed faces 41A.

The area of the exposed face 41A of the first support wire 41 may be equal to the sectional area of the first support wire 41 inside the element body BD by a method of cutting with a dicing machine or a process after cutting with a dicing machine. For example, when the first side face 91 including the exposed face 41A is polished after cutting with a dicing machine, the shape of the exposed face 41A is the same as the sectional shape of the first support wire 41 inside the element body BD, and thus, the sectional areas of them are the same. The same applies to the second support wire 42.

In the above embodiment, the method of manufacturing the inductor component 10 is not limited to the example of the above embodiment. For example, in the first embodiment and the second embodiment, the step of forming the first inductor wire 20R and the second inductor wire 20L and the step of forming the first support wire 41 and the second support wire may be different. For example, after the first inductor wire 20R and the second inductor wire 20L are formed, the support wires 41 and 42 may be formed of a material different from that of the first inductor wire 20R.

What is claimed is:

1. An inductor component comprising:
an element body having a main face;
an inductor wire extending in parallel with the main face with a number of turns being 0.5 turns or less in the element body;
a vertical wire extending in a thickness direction from the inductor wire toward the main face and connected to the inductor wire; and
a plurality of terminal portions exposed from the main face,
wherein
at least one of the plurality of terminal portions is an external terminal that is electrically connected to the inductor wire;
each of other of the terminal portions other than the external terminal among the plurality of terminal portions is a dummy portion that is not electrically connected to the inductor wire;
when viewed from the thickness direction, the main face has a two-fold symmetrical shape with respect to a geometric center of the main face;
when the main face is divided into a plurality of mutually congruent imaginary regions, a number of the imaginary regions being equal to a number of the terminal portions when viewed from the thickness direction:
the terminal portion is disposed in each of the imaginary regions;
when one of the dummy portions is defined as a specific dummy portion and the terminal portion, which is provided in the imaginary region at a two-fold symmetrical position about the geometric center with respect to the imaginary region in which the specific dummy portion is provided, is defined as a specific terminal portion, a shape of the specific dummy portion is different from a shape of the specific terminal portion;

the vertical wire includes a first vertical wire and a second vertical wire;

the inductor wire includes a wiring body that extends linearly, a first pad that is provided at a first end of the wiring body and to which the first vertical wire is connected, and a second pad that is provided at a second end of the wiring body and to which the second vertical wire is connected;

the inductor wire includes a plurality of the inductor wires;

when one of the plurality of inductor wires is defined as a first inductor wire and another of the plurality of inductor wires is defined as a second inductor wire, one of the first pad and the second pad in the first inductor wire is identical to one of the first pad and the second pad in the second inductor wire;

the wiring body of the first inductor wire extends linearly, and the second inductor wire includes two straight portions extending in different directions and a connection portion connecting the two straight portions.

2. The inductor component according to claim 1, wherein the plurality of terminal portions is disposed at two-fold symmetrical positions with respect to the geometric center of the main face, and the dummy portion is disposed at a position that is not two-fold symmetric with respect to the geometric center of the main face.

3. The inductor component according to claim 2, wherein the dummy portion includes a plurality of the dummy portions, and at least one of the plurality of dummy portions has a shape different from shapes of other of the dummy portions.

4. The inductor component according to claim 1, wherein the main face has a quadrangular shape; and when an imaginary straight line passing through the geometric center of the main face and parallel to one side of the main face is drawn, and the main face is imaginarily divided into a first region and a second region, the dummy portion is not provided in the first region.

5. The inductor component according to claim 4, wherein the dummy portions, whose number is equal to or larger than a number of the external terminals in the second region are provided in the second region.

6. The inductor component according to claim 1, wherein the plurality of terminal portions is disposed at two-fold symmetrical positions with respect to the geometric center of the main face;

the dummy portions include a first dummy portion and a second dummy portion that are disposed at two-fold symmetrical positions with respect to the geometric center of the main face; and the specific dummy portion is the first dummy portion, and the specific terminal portion is the second dummy portion.

7. The inductor component according to claim 1, wherein an area of the dummy portion is equal to an area of the external terminal when viewed from the thickness direction.

8. The inductor component according to claim 1, wherein at least part of the dummy portion overlaps the inductor wire when viewed from the thickness direction.

9. The inductor component according to claim 1, wherein the external terminal includes a plurality of the external terminals, the dummy portion includes a plurality of the dummy portions, and a number of the dummy portions is smaller than a number of the external terminals.

10. The inductor component according to claim 1, wherein the vertical wire includes a first vertical wire and a second vertical wire;

the inductor wire includes a wiring body that extends linearly, a first pad that is provided at a first end of the wiring body and to which the first vertical wire is connected, and a second pad that is provided at a second end of the wiring body and to which the second vertical wire is connected;

the wiring body includes a plurality of the wiring bodies; and a number of the terminal portions is four or more.

11. The inductor component according to claim 1, wherein the terminal portion includes a plurality of conductive layers.

12. The inductor component according to claim 1, wherein half or more of the external terminals have an optically same color as the dummy portion when viewed from the thickness direction.

13. An inductor component comprising:

an element body having a main face;

an inductor wire extending in parallel with the main face with a number of turns being 0.5 turns or less in the element body;

a vertical wire extending in a thickness direction from the inductor wire toward the main face and connected to the inductor wire; and a plurality of terminal portions exposed from the main face, wherein at least one of the plurality of terminal portions is an external terminal that is electrically connected to the inductor wire;

each of other of the terminal portions other than the external terminal among the plurality of terminal portions is a dummy portion that is not electrically connected to the inductor wire;

when viewed from the thickness direction, the main face has a two-fold symmetrical shape with respect to a geometric center of the main face;

when the main face is divided into a plurality of mutually congruent imaginary regions, a number of the imaginary regions being equal to a number of the terminal portions when viewed from the thickness direction:

the terminal portion is disposed in each of the imaginary regions;

when one of the dummy portions is defined as a specific dummy portion and the terminal portion, which is provided in the imaginary region at a two-fold symmetrical position about the geometric center with respect to the imaginary region in which the specific dummy portion is provided, is defined as a specific terminal portion, a shape of the specific dummy portion is different from a shape of the specific terminal portion;

a surface of the external terminal includes a smooth portion and a rough portion having a surface roughness larger than a surface roughness of the smooth portion; and a surface of the dummy portion has a surface roughness larger than the surface roughness of the smooth portion.

14. The inductor component according to claim 13, wherein the smooth portion is disposed on the vertical wire.

15. The inductor component according to claim 1, wherein the external terminal has a recess recessed in the thickness direction.

16. The inductor component according to claim 15, wherein the recess is disposed on the vertical wire.

17. An inductor component comprising:

an element body having a main face;

an inductor wire extending in parallel with the main face with a number of turns being 0.5 turns or less in the element body;

a vertical wire extending in a thickness direction from the inductor wire toward the main face and connected to the inductor wire; and a plurality of terminal portions exposed from the main face, wherein at least one of the plurality of terminal portions is an external terminal that is electrically connected to the inductor wire;

each of other of the terminal portions other than the external terminal among the plurality of terminal portions is a dummy portion that is not electrically connected to the inductor wire;

when viewed from the thickness direction, the main face has a two-fold symmetrical shape with respect to a geometric center of the main face;

when the main face is divided into a plurality of mutually congruent imaginary regions, a number of the imaginary regions being equal to a number of the terminal portions when viewed from the thickness direction:

the terminal portion is disposed in each of the imaginary regions;

when one of the dummy portions is defined as a specific dummy portion and the terminal portion, which is provided in the imaginary region at a two-fold symmetrical position about the geometric center with respect to the imaginary region in which the specific dummy portion is provided, is defined as a specific terminal portion, a shape of the specific dummy portion is different from a shape of the specific terminal portion;

the element body includes a magnetic layer covering the inductor wire and an insulation layer laminated on the magnetic layer;

an outer face of the insulation layer constitutes the main face; and the dummy portion is disposed on the magnetic layer and is in contact with the insulation layer.

18. An inductor component comprising:

an element body having a main face;

an inductor wire extending in parallel with the main face with a number of turns being 0.5 turns or less in the element body;

a vertical wire extending in a thickness direction from the inductor wire toward the main face and connected to the inductor wire; and a plurality of terminal portions exposed from the main face, wherein at least one of the plurality of terminal portions is an external terminal that is electrically connected to the inductor wire;

each of other of the terminal portions other than the external terminal among the plurality of terminal portions is a dummy portion that is not electrically connected to the inductor wire;

when viewed from the thickness direction, the main face has a two-fold symmetrical shape with respect to a geometric center of the main face;

when the main face is divided into a plurality of mutually congruent imaginary regions, a number of the imaginary regions being equal to a number of the terminal portions when viewed from the thickness direction:

the terminal portion is disposed in each of the imaginary regions;

when one of the dummy portions is defined as a specific dummy portion and the terminal portion, which is provided in the imaginary region at a two-fold symmetrical position about the geometric center with respect to the imaginary region in which the specific dummy portion is provided, is defined as a specific terminal portion, a shape of the specific dummy portion is different from a shape of the specific terminal portion;

the element body includes a magnetic layer covering the inductor wire and an insulation layer laminated on the magnetic layer;

an outer face of the insulation layer constitutes the main face; and the dummy portion is a portion where the magnetic layer is exposed from the insulation layer.

19. The inductor component according to claim 1, wherein at least part of the dummy portion overlaps the connection portion when viewed from the thickness direction.

20. The inductor component according to claim 1, wherein each respective one of the terminal portions, including the dummy portion, does not overlap into multiple of the imaginary regions.

* * * * *